(12) United States Patent
Frazier et al.

(10) Patent No.: US 11,580,119 B2
(45) Date of Patent: Feb. 14, 2023

(54) SYSTEM AND METHOD FOR AUTOMATIC PERSONA GENERATION USING SMALL TEXT COMPONENTS

(71) Applicant: Cognism Limited, Richmond (GB)

(72) Inventors: Eliot S Frazier, London (GB); Johannes Julien Frederik Erett, London (GB); James A Hodson, El Cerrito, CA (US)

(73) Assignee: Cognism Limited

( * ) Notice: Subject to any disclaimer, the term of this patent is extended or adjusted under 35 U.S.C. 154(b) by 0 days.

(21) Appl. No.: 17/481,907

(22) Filed: Sep. 22, 2021

(65) Prior Publication Data
US 2022/0114186 A1    Apr. 14, 2022

Related U.S. Application Data

(60) Provisional application No. 63/081,749, filed on Sep. 22, 2020.

(51) Int. Cl.
| | |
|---|---|
| *G06F 16/2457* | (2019.01) |
| *G06F 16/27* | (2019.01) |
| *G06N 3/04* | (2006.01) |
| *G06F 21/60* | (2013.01) |
| *G06F 16/28* | (2019.01) |
| *G06F 16/242* | (2019.01) |

(52) U.S. Cl.
CPC ...... *G06F 16/24578* (2019.01); *G06F 16/242* (2019.01); *G06F 16/27* (2019.01); *G06F 16/287* (2019.01); *G06F 21/602* (2013.01); *G06N 3/0445* (2013.01)

(58) Field of Classification Search
CPC .................. G06F 16/24578; G06N 3/0445
See application file for complete search history.

(56) References Cited

U.S. PATENT DOCUMENTS

| | | | |
|---|---|---|---|
| 2019/0139064 A1* | 5/2019 | Chen ................ | G06Q 30/0204 |
| 2020/0073882 A1* | 3/2020 | Guggilla .............. | G06F 16/353 |
| 2020/0159690 A1* | 5/2020 | J ............................. | G06N 20/20 |
| 2020/0242134 A1* | 7/2020 | Salhin ................... | G06F 16/906 |
| 2021/0049169 A1* | 2/2021 | Wardell ................ | G06F 16/355 |
| 2021/0182343 A1* | 6/2021 | Li ....................... | G06F 16/9027 |

* cited by examiner

*Primary Examiner* — James Trujillo
*Assistant Examiner* — J Mitchell Curran
(74) *Attorney, Agent, or Firm* — Marin Patents LLC; Gustavo Marin

(57) ABSTRACT

Systems and methods for automated and explainable machine learning to generate seamlessly actionable insights by generating explainable personas directly from customer relationship management systems are disclosed. The personas are defined as a collection of segments, scored by likelihood to generate good opportunities, accompanied ranked profile attribute importance, with descriptive names and summaries, associated human and database readable queries which have been generated to optimally find cluster candidates in a broader data universe. Such a system would effectively and accurately model the composition of past clients, perform the categorization in an explainable way such that actions can be taken on the information to have predictable results. What is further required are the mean to categorize small text components, trained over dependent and independent model sets, to enable a cleaner and more explicit representation of information rich short-strings, in order to facilitate a more meaningful representation of the user profiles.

3 Claims, 15 Drawing Sheets

SYSTEM AND METHOD FOR AUTOMATIC PERSONA GENERATION USING SMALL TEXT COMPONENTS

CROSS-REFERENCE TO RELATED APPLICATIONS

This application claims the benefit of, and priority to U.S. provisional application 63/081,749 titled, "SYSTEM AND METHOD FOR AUTOMATIC PERSONA GENERATION USING SMALL TEXT COMPONENTS" filed on Sep. 22, 2020, the entire specification of which is incorporated herein by reference.

BACKGROUND OF THE INVENTION

Field of the Art

The disclosure relates to the field of data profile segmentation, and more particularly to the field of persona generation to discover groups of similar data profiles based on small variations among a plurality of data profiles within each group.

Discussion of the State of the Art

In the field of customer segmentation, dividing a broad consumer market, comprises identifying existing and potential customers and organize them into sub-groups of consumers (known as segments) based on shared characteristics. In dividing or segmenting markets, systems known in the art typically identify common characteristics such as shared needs, common interests, similar lifestyles, or even similar demographic profiles whereby the primary aim identify high yield segments—that is, segments that are likely to be the most profitable or that have growth potential—so that these can be selected to become target to meet business objectives.

Many different ways to segment a market are present in the art. In business-to-business markets, sellers may segment markets into different types of businesses or geographies. While in business-to-consumer markets, sellers may segment the market into demographic segments, lifestyle segments, behavioral segments, or any other meaningful segment.

Market segmentation pivots on an idea that different market segments require different techniques for addressing each segment which may comprise different offers, prices, promotion, distribution, or some combination of marketing variables. Segmentation is not only designed to identify the most profitable segments, but also to develop data profiles of key segments in order to better understand their needs and purchase motivations. Insights from segmentation analysis are subsequently used to support sales and marketing strategy development and planning.

In more advanced systems known in the art, cluster analysis is used to discover groups of similar customers based on finding small variations among customers within each group. These groups are often known as "customer archetypes" or "personas"; however, with systems known in the art a large dataset is often required in order to properly classify key actors in the sales process to create an effective model to use for future classification. In these cases, classification becomes inaccurate if not impossible, specifically when the amount of data available for classification is only a few words in length and is therefore difficult to represent in a meaningful way. Furthermore, understanding clusters, which are generally defined as regions or classes in an abstract space, often requires laborious analysis and deconstruction in order to generate actionable insight.

What is needed is are systems and methods for an automated and explainable systems to generate seamless actionable insights, by generating explainable personas directly from customer relationship management systems, with personas defined as a collection of segments, scored by likelihood to generate good customer opportunities.

SUMMARY OF THE INVENTION

Accordingly, the inventor has conceived and reduced to practice, in a preferred embodiment of the invention, systems and methods for automatic persona generation for a plurality of data profiles.

Systems and methods disclosed herein provide an automated mechanism to process new data profile into a persona with an associated predictable behavior.

According to a preferred embodiment of the invention, a system for automatic persona generation for a plurality of data profiles comprises a plurality of phases to cluster a plurality of data profiles into one or more personas.

In a first aspect, a persona builder may pre-define a plurality of standard personas (for example, "female entrepreneur", "sales leader", "IT decision maker", etc.). Persona builder may then create a microservice that takes a collection of profiles as input and computes one or more corresponding personas for each profile.

In a preferred embodiment, attributes and a definition for each given persona may be pre-defined or gleaned from the persona analysis.

Persona builder Input profiles may include information data profile information. In some embodiments a plurality of customer relationship management (CRM) profile information (for example, lead information, opportunity information, contact creation date, lead status, lead conversion date, deal volume, and the like).

Persona builder may implement pre-processing pipeline for data profile processing whereby classifiers are trained for each persona and results (for example, "356 of records match 19 Personas") are presented on a display device or stored in a database, or both.

In a second aspect, personas may be presented on a display device to provide a user with persona-based new lead discovery.

In a third aspect, profile ranker may calculate a score (for example, a ranking based on lead qualification) for each profile based on event data and, in some embodiments, company growth. Accordingly, data profiled are ranked based on the ranking.

In a fourth aspect, persona builder may incorporate lead performance indicators and correlation into a profile recommendation or ranking whereby a performance score may be calculated per converted lead based on historical performance (for example, deal volume, sales cycle, closure date—entry date, recency of a deal, and the like).

In some embodiments, systems and methods disclosed herein may calculate which lead attributes correlate the most with performance scores In some embodiments, systems and methods disclosed herein may recommend profiles, which may incorporate performance predictors:
 Grouped by persona, identify qualified personas
 Identify specifically qualified attribute values
 Identify ranking, deal-specific qualification, and combined score In a preferred embodiment, cluster analysis using small text components may be used to discover groups of similar personas based on an analysis of limited text indicators to characterize new data profiles.

Accordingly, accurately segmented data profiles achieve effective engagement of customers using a personalized approach, that is, identifying what is important for a particular segment and addressing those needs. A common cluster analysis method in systems known in the art is k-means cluster analysis. K-means clustering aims to partition a plurality of observations into a subset of clusters in which each observation belongs to the cluster with the nearest mean, serving as a prototype of the cluster. This results in a partitioning of the data space into cells. The clusters that result assist in better customer modeling and predictive analytics and are also used to target customers with offers and incentives personalized to their wants, needs and preferences.

BRIEF DESCRIPTION OF THE DRAWING FIGURES

The accompanying drawings illustrate several embodiments of the invention and, together with the description, serve to explain the principles of the invention according to the embodiments. It will be appreciated by one skilled in the art that the particular embodiments illustrated in the drawings are merely exemplary and are not to be considered as limiting of the scope of the invention or the claims herein in any way.

DETAILED DESCRIPTION

Figure 1:
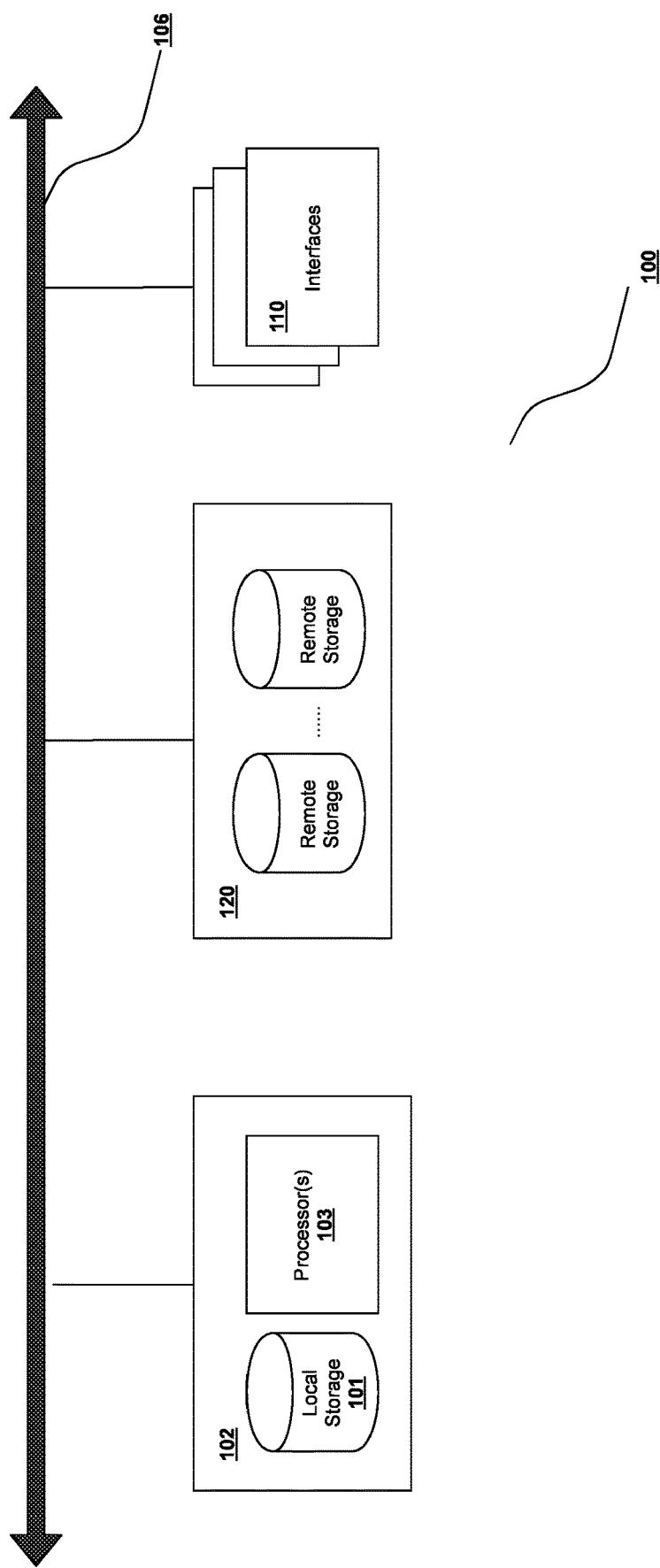
FIG. 1 is a block diagram illustrating an exemplary hardware architecture of a computing device used in an embodiment of the invention.

The inventor has conceived, and reduced to practice, a system and method for automatic persona generation for a plurality of data profiles.

One or more different inventions may be described in the present application. Further, for one or more of the inventions described herein, numerous alternative embodiments may be described; it should be appreciated that these are presented for illustrative purposes only and are not limiting of the inventions contained herein or the claims presented herein in any way. One or more of the inventions may be widely applicable to numerous embodiments, as may be readily apparent from the disclosure. In general, embodiments are described in sufficient detail to enable those skilled in the art to practice one or more of the inventions, and it should be appreciated that other embodiments may be utilized and that structural, logical, software, electrical and other changes may be made without departing from the scope of the particular inventions. Accordingly, one skilled in the art will recognize that one or more of the inventions may be practiced with various modifications and alterations. Particular features of one or more of the inventions described herein may be described with reference to one or more particular embodiments or figures that form a part of the present disclosure, and in which are shown, by way of illustration, specific embodiments of one or more of the inventions. It should be appreciated, however, that such features are not limited to usage in the one or more particular embodiments or figures with reference to which they are described. The present disclosure is neither a literal description of all embodiments of one or more of the inventions nor a listing of features of one or more of the inventions that must be present in all embodiments.

Headings of sections provided in this patent application and the title of this patent application are for convenience only and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an embodiment with several components in communication with each other does not imply that all such components are required. To the contrary, a variety of optional components may be described to illustrate a wide variety of possible embodiments of one or more of the inventions and in order to illustrate one or more aspects of the inventions more fully. Similarly, although process steps, method steps, algorithms or the like may be described in a sequential order, such processes, methods, and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred. Also, steps are generally described once per embodiment, but this does not mean they must occur once, or that they may only occur once each time a process, method, or algorithm is carried out or executed. Some steps may be omitted in some embodiments or some occurrences, or some steps may be executed more than once in a given embodiment or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments of one or more of the inventions need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of embodiments of the present invention in which, for example, functions may be executed out of order from that shown or discussed, including substantially concurrently or in reverse order, depending on the functionality involved, as would be understood by those having ordinary skill in the art.

Hardware Architecture

Generally, the techniques disclosed herein may be implemented on hardware or a combination of software and hardware. For example, they may be implemented in an operating system kernel, in a separate user process, in a library package bound into network applications, on a specially constructed machine, on an application-specific integrated circuit (ASIC), or on a network interface card.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be described herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, or other appropriate computing device), a consumer electronic device, a music player, or any other suitable electronic device, router, switch, or other suitable device, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or other appropriate virtual environments).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface (s) 110. In at least one embodiment, CPU 102 may be caused to perform one or more of the different types of functions and/or operations under the control of software modules or components, which for example, may include an operating system and any appropriate applications software, drivers, and the like.

CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random-access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like. It should be further appreciated that CPU 102 may be one of a variety of system-on-a-chip (SOC) type hardware that may include additional hardware such as memory or graphics processing chips, such as a Qualcomm SNAPDRAGON™ or Samsung EXYNOS™ CPU as are becoming increasingly common in the art, such as for use in mobile devices or integrated devices.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, FIREWIRE™, THUNDERBOLT™, PCI, parallel, radio frequency (RF), BLUETOOTH™, near-field communications (e.g., using near-field magnetics), 802.11 (WiFi), frame relay, TCP/IP, ISDN, fast Ethernet interfaces, Gigabit Ethernet interfaces, Serial ATA (SATA) or external SATA (ESATA) interfaces, high-definition multimedia interface (HDMI), digital visual interface (DVI), analog or digital audio interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include physical ports appropriate for communication with appropriate media. In some cases, they may also include an independent processor (such as a dedicated audio or video processor, as is common in the art for high-fidelity A/V hardware interfaces) and, in some instances, volatile and/or non-volatile memory (e.g., RAM).

Although the system shown in FIG. 1 illustrates one specific architecture for a computing device 100 for implementing one or more of the inventions described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system according to the invention that includes a client device (such as a tablet device or smartphone running client software) and server systems (such as a server system described in more detail below).

Regardless of network device configuration, the system of the present invention may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory (as is common in mobile devices and integrated systems), solid state drives (SSD) and "hybrid SSD" storage drives that may combine physical components of solid state and hard disk drives in a single hardware device (as are becoming increasingly common in the art with regard to personal computers), memristor memory, random access memory (RAM), and the like. It should be appreciated that such storage means may be integral and non-removable (such as RAM hardware modules that may be soldered onto a motherboard or otherwise integrated into an electronic device), or they may be removable such as swappable flash memory modules (such as "thumb drives" or other removable media designed for rapidly exchanging physical storage devices), "hot-swappable" hard disk drives or solid state drives, removable optical storage discs, or other such removable media, and that such integral and removable storage media may be utilized interchangeably. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
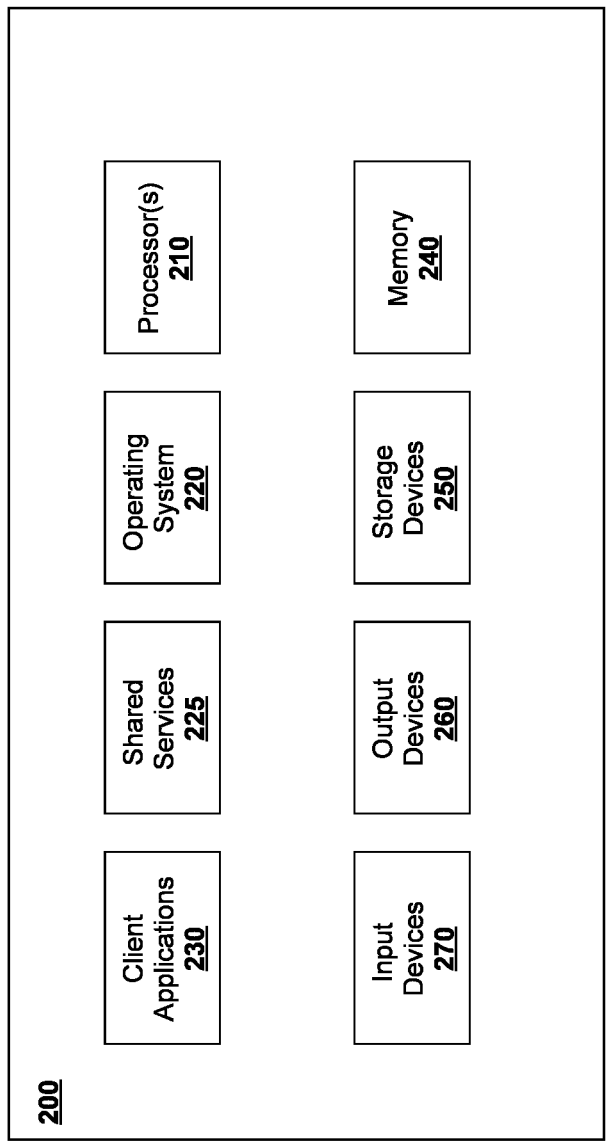
FIG. 2 is a block diagram illustrating an exemplary logical architecture for a client device, according to an embodiment of the invention.

In some embodiments, systems according to the present invention may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments of the invention, such as for example a client application 230. Processors 210 may carry out computing instructions under control of an operating system 220 such as, for example, a version of Microsoft's WINDOWS™ operating system, Apple's Mac OS/X or iOS operating systems, some variety of the Linux operating system, Google's ANDROID™ operating system, or the like. In many cases, one or more shared services 225 may be operable in system 200 and may be useful for providing common services to client applications 230. Services 225 may for example be WINDOWS™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form (such as those described above, referring to FIG. 1). Examples of storage devices 250 include flash memory, magnetic hard drive, CD-ROM, and/or the like.

Figure 3:
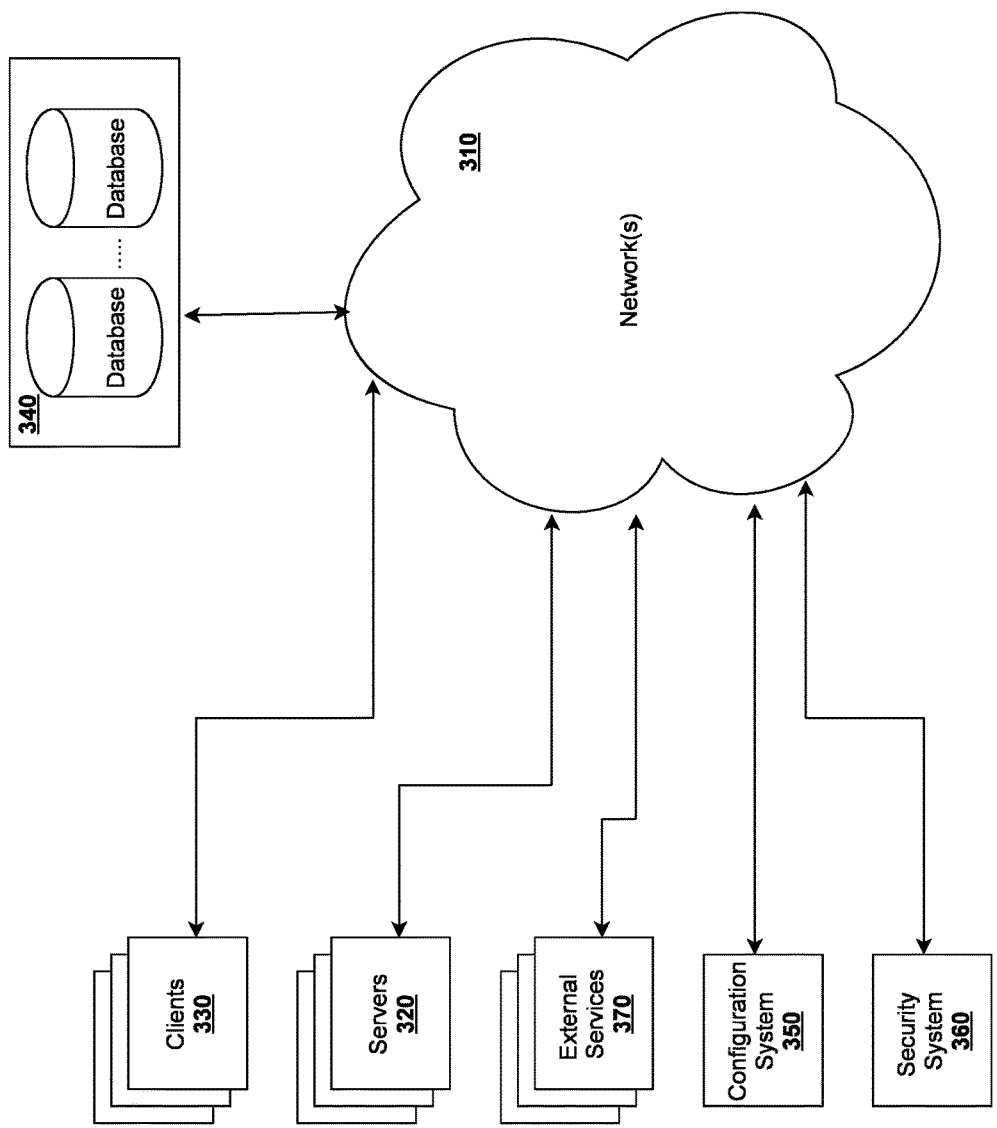
FIG. 3 is a block diagram showing an exemplary architectural arrangement of clients, servers, and external services, according to an embodiment of the invention.

In some embodiments, systems of the present invention may be implemented on a distributed computing network, such as one having any number of clients and/or servers. Referring now to FIG. 3, there is shown a block diagram depicting an exemplary architecture 300 for implementing at least a portion of a system according to an embodiment of the invention on a distributed computing network. According to the embodiment, any number of clients 330 may be provided. Each client 330 may run software for implementing client-side portions of the present invention; clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network (such as CDMA or GSM cellular networks), a wireless network (such as Wi-Fi, WiMAX, LTE, and so forth), or a local area network (or indeed any network topology known in the art; the invention does not prefer any one network topology over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments of the invention, clients 330 or servers 320 (or both) may make use of one or more specialized services or appliances that may be deployed locally or remotely across one or more networks 310. For example, one or more databases 340 may be used or referred to by one or more embodiments of the invention. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used according to the invention. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments of the invention may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments of the invention without limitation, unless a specific security 360 or configuration system 350 or approach is specifically required by the description of any specific embodiment.

Figure 4:
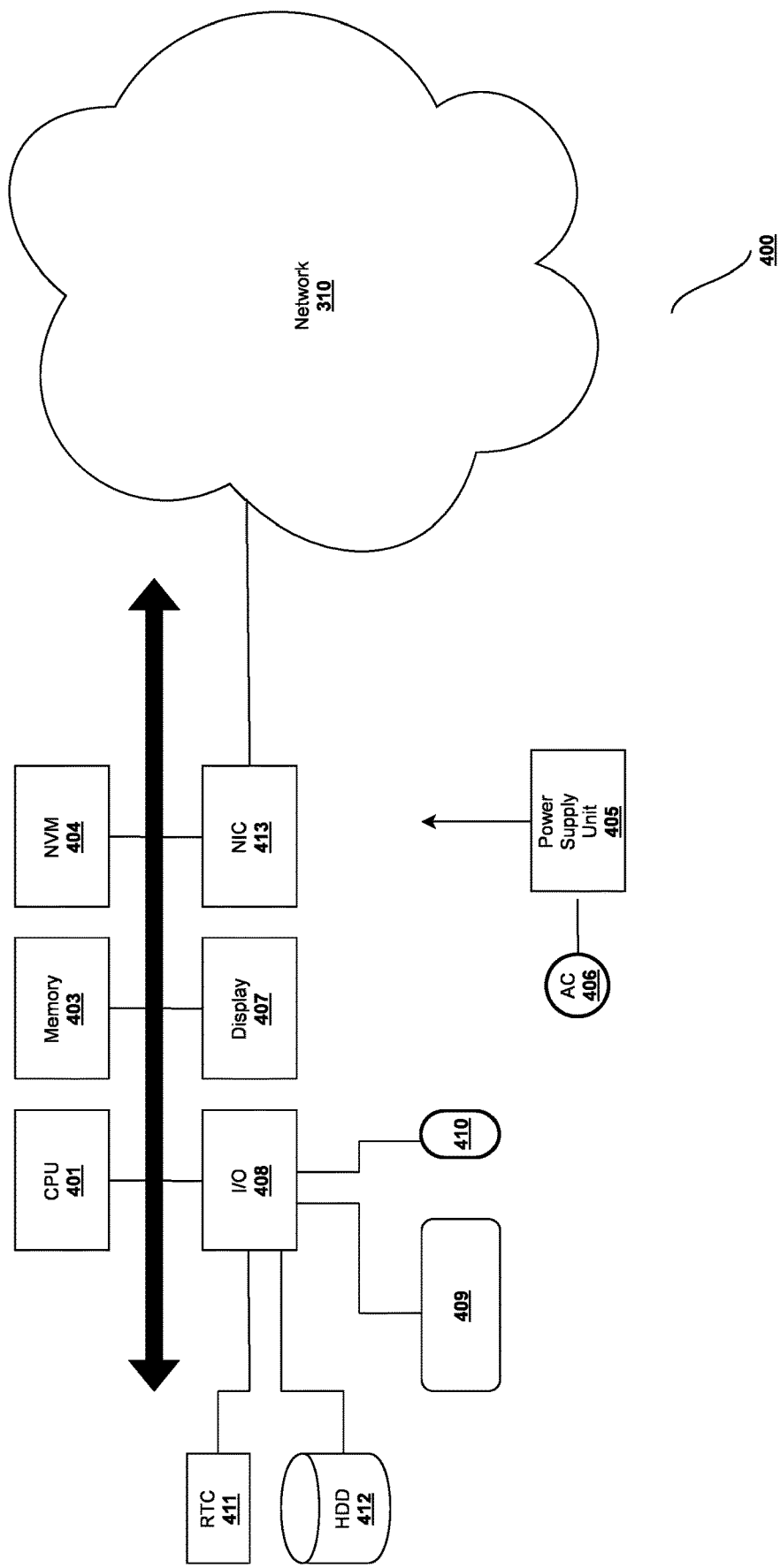
FIG. 4 is another block diagram illustrating an exemplary hardware architecture of a computing device used in various embodiments of the invention.

FIG. 4 shows an exemplary overview of a computer system 400 as may be used in any of the various locations throughout the system. It is exemplary of any computer that may execute code to process data. Various modifications and changes may be made to computer system 400 without departing from the broader spirit and scope of the system and method disclosed herein. CPU 401 is connected to bus 402, to which bus is also connected memory 403, nonvolatile memory 404, display 407, I/O unit 408, and network interface card (NIC) 413. I/O unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific novel functions of the current system and method disclosed herein. It should be appreciated that some or all components illustrated may be combined, such as in various integrated applications (for example, Qualcomm or Samsung SOC-based devices), or whenever it may be appropriate to combine multiple capabilities or functions into a single hardware device (for instance, in mobile devices such as smartphones, video game consoles, in-vehicle computer systems such as navigation or multimedia systems in automobiles, or other integrated hardware devices).

In various embodiments, functionality for implementing systems or methods of the present invention may be distributed among any number of client and/or server components. For example, various software modules may be implemented for performing various functions in connection with the present invention, and such modules may be variously implemented to run on server and/or client components.

Conceptual Architecture

Figure 5:
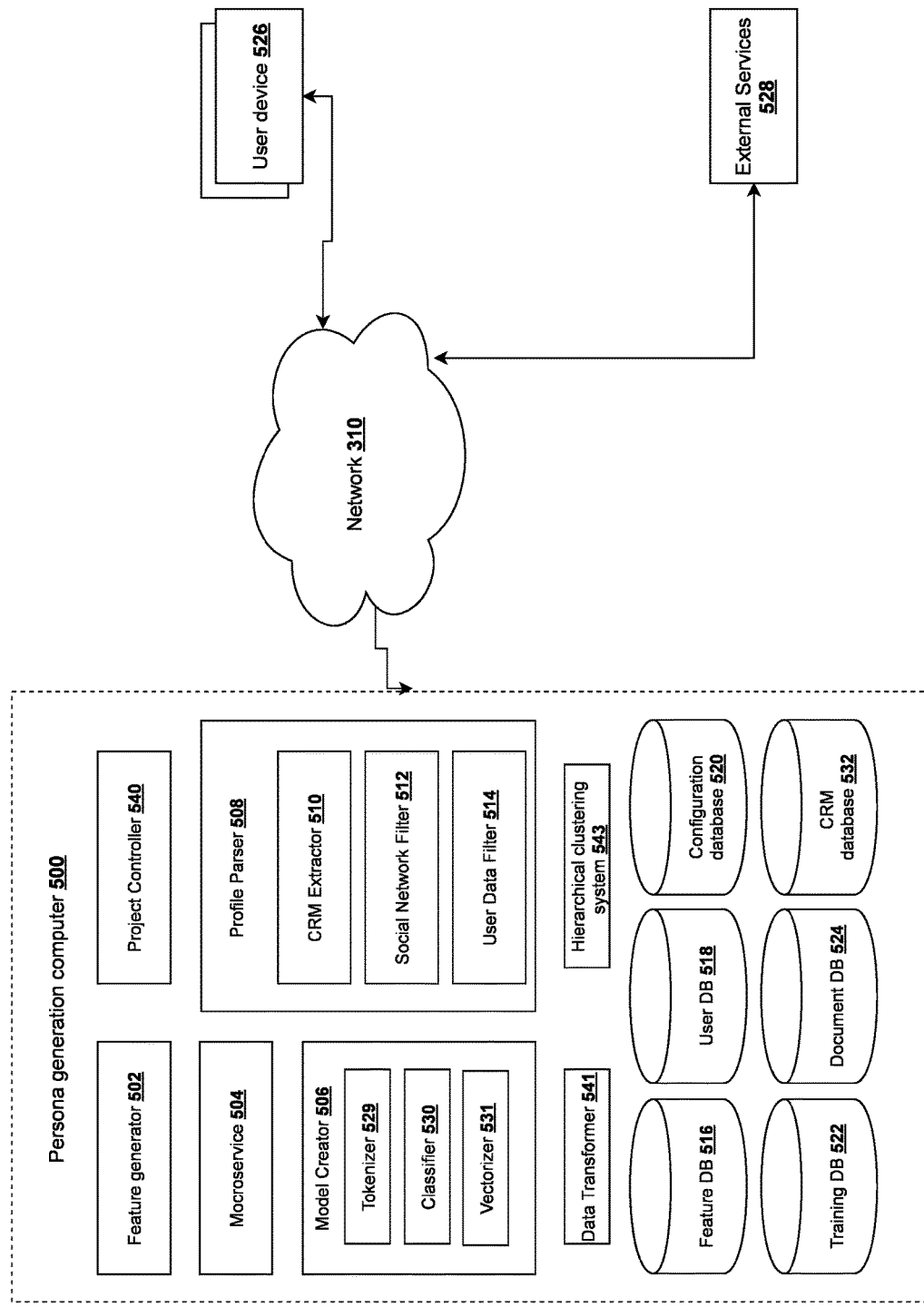
FIG. 5 is a block diagram illustrating a system for persona generation for a plurality of data profiles, according to a preferred embodiment of the invention.

FIG. 5 is a block diagram illustrating a persona generation computer for generation of personas associated with a plurality of data profiles, according to a preferred embodiment of the invention. According to the embodiment, a persona generation computer 500 comprises a processor 210, memory 240 and a plurality of programming instructions, the plurality of programming instructions stored in memory 240 that when executed by processor 210 cause the processor to identify and locate expression varieties within an electronic document. A persona generation computer 500 further comprises: project controller 540, feature generator 502 and feature database 516; microservice 504; Model creator 506 further comprising tokenizer 529, classifier 530, and vectorizer 531; profile parser 508 further comprising CRM extractor 510, social media filter 512, and user data filter 514; data transformer 542; and hierarchical clustering system 543. In addition, persona generation computer 500 may comprise of different datastores such as user database 518, configuration database 520, training database 522, document database 524, and CRM database 532.

Feature generator 502 may compute features as a means for generation of one or more personas. Features may inform decisions for a single profile to be categorized as profile-level features, context-level features, and CRM-level features. Feature generator 502 further creates features for different personas based on individual data, for example, segment data (e.g., age, gender, etc.) and additionally geographic data (e.g., home location, street number, or postal district). Further, data from online activities, for example, social network activity, preferred websites information, subscriptions, location tagging data, and the like may also be utilized by feature generator 502 to generate features for building a persona. Such user information may be stored, by feature generator 502, within feature database 516. In some embodiments feature generator 502 may employ k-means agglomeration and semantic embedding models to generate features for personas. Feature generator 502 may compute features comprising syntactic dependency parsing, polarity seeking, named entity features, part-of-speech (POS) features, and the like.

In an embodiment, microservice 504 fetches above user information from one or more sources and input such user information to feature generator 502 to facilitate generation of features of the persona. Microservice 504, in an example, may fetch user information internally from historically stored data in user database 518, document database 524, and/or externally fetch data from user device 526 or external services 528. In the embodiment, internally stored data may include individual user data and geographical user data, while externally stored data may include social network data, user preference data, and CRM data. Microservice 504 may output the generated persona, using the features generated by the feature generator 502. In an embodiment, microservice 504 may provide an algorithm to construct one or more attributes associated with a particular persona to be created.

Model creator 506, in some embodiments, may use a conditional random field (CRF) model to perform tagging to learn contextual sequence relationships and patterns, whereby the properties of the inputs, both prior and subsequent are used in order to characterize input while holding relevance. Model creator 506 may create a machine learning model by learning underlying linguistic/syntactic relationships between custom defined expression categories of a schema using systems and methods disclosed herein. Model creator 506 may generate sequences of labels for sequences of input features and create a model. It should be appreciated that labeling data typically involves augmenting a set of unlabeled data such that each piece of that unlabeled data is associated with one or more meaningful "tag," "label," or "classification" that is informative or desirable to know. Model creator 506 may learn a variety of clustering models, with different values of k (that is, number of clusters), to create clusters of different granularities to serve as rich semantic features that may aid the model as high-level semantic groups. Model creator 506 may further learn a semantic model over natural language associated with each expression variety, to pair semantic vectors with each expression variety, accounting for the structural and semantic content of an email. Model creator 506 may learn some semantic modelling for profile attributes, to enable meaningful comparisons of attributes across different data profiles. Model creator 506 may learn a neural sequence, to learn underlying trends in receptivity to particular correspondence approaches, as measured by a quantified objective, given the prior correspondence chains, and profile information, whereby the training set can be curated to both select only those correspondence chains with the necessary objective data and weigh the number of samples according proportionally to the objective score.

Profile parser 508 may parse data profiles to extract metadata that may include detected data points such as gender, age, location, designation, company relationships, organizational hierarchy, business volumes, and the like associated with said data profiles. Profile parser 508 may store extracted metadata into a metadata object. Profile parser 508 may comprise, at least, CRM extractor 510 to identify and extract CRM data associated with a data profile; social network filter 512 for filtering and parsing social network associated with a data profile; and user data filter 514 for parsing received data profiles to extract user preference data associated with each of the received data profiles.

User database 518 comprises data structures for storing user information such as data profile or other information associated with a user, such as a client or a sales target. CRM database 532 may be used to store deal information, deal recency, lead status, lead conversion date, and the like associated with a plurality of data profiles. Training database 522 may comprise a plurality of training data used to train a Neural Sequence model and/or a plurality of CRF models, semantic models, and other machine learning models core to the invention. Document database 524 may comprise a plurality of electronic documents. Electronic documents may be emails, chat transcripts from messaging platforms, speech-to-text communications, social network posts, location tags, and the like. In some embodiments, instead of processing electronic documents from document database 524, systems and methods disclosed herein may receive communications from real-time communication streams such as VoIP communications, POTS communications, and the like. Similarly, data profiles may come from external services 528 instead of document database 524, or both.

User device 526 may be a mobile computing device or other computing device to send and receive electronic documents. In some embodiments, user device 530 may be used to view an analysis resultant of systems and methods disclosed herein.

External services 528 may be a third-party CRM service, a social network, a messaging service, an email server, or some other cloud-based electronic service that may coordinate, manage, provide, or save user data.

Detailed Description of Exemplary Embodiments

Figure 6:
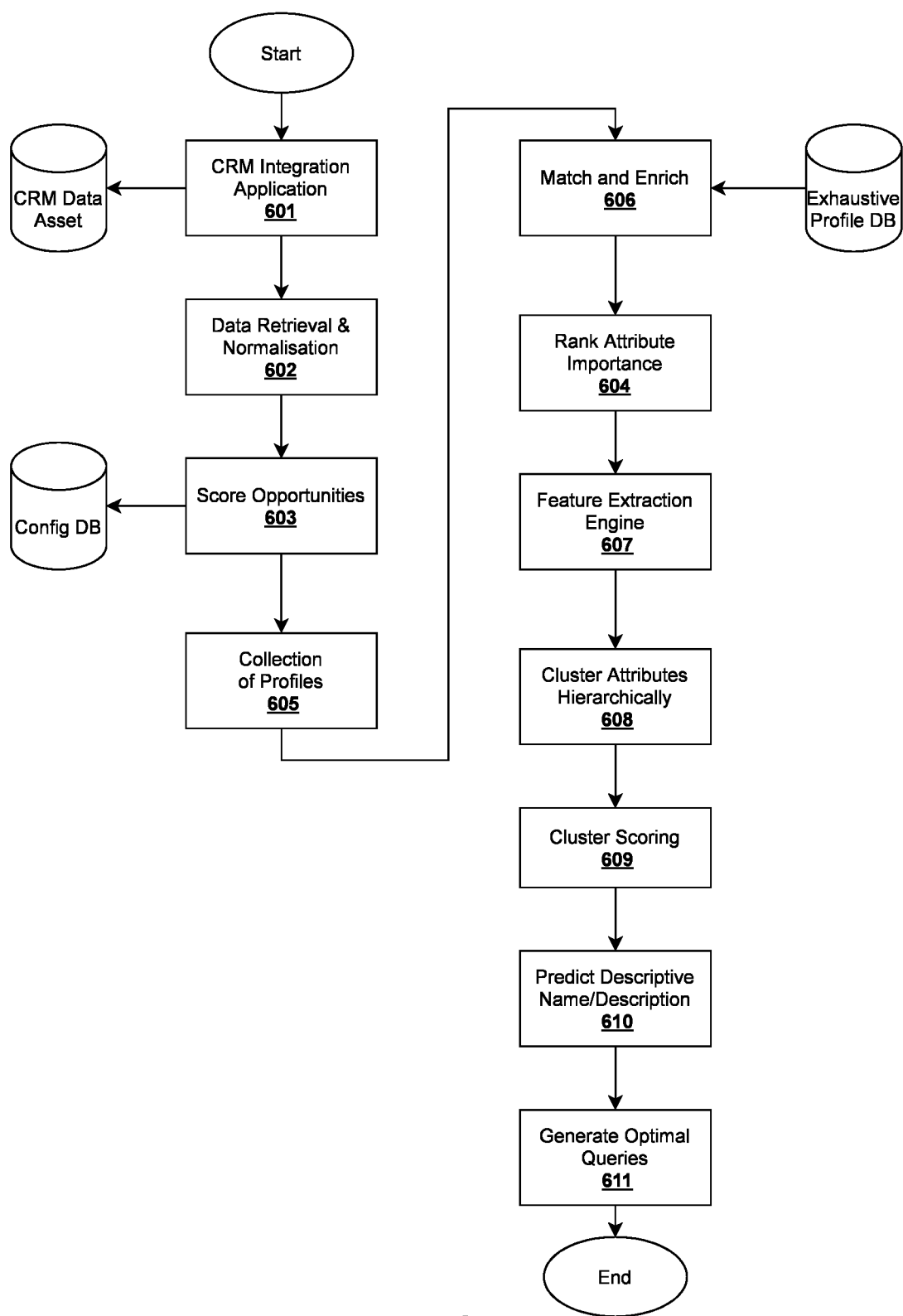
FIG. 6 is a flow diagram illustrating a method for persona generation using identification, vectorization, and clustering, according to a preferred embodiment of the invention.

FIG. 6 is a flow diagram illustrating a method for persona generation using identification, vectorization, and clustering, according to a preferred embodiment of the invention.

According to the embodiment, in a first step 601, microservice 504 may initiate integration of one or more CRM applications running on persona generation computer 500 and/or having a sequence running virtually over external services 528. In one embodiment, microservice 504 may integrate all active and dormant sequences of one or more CRM applications associated with, e.g., user devices 526 such that CRM and other data associated with such applications may be used for further processing as described in the following. In another embodiment, the one or more CRM applications may include Salesforce™, HubSpot™, Pipedrive™, Freshworks™, and the like.

In a next step 602, project controller 540 may extract data from the sequences of the one or more CRM applications for normalization. In an embodiment, the extracted data may include CRM data for a plurality of customer accounts, such as deal information, deal recency, lead status, lead conversion date, and the like. In another embodiment, the extracted data may include user preferences, location data, email data, messaging data, and the like. In one embodiment, the data may be extracted from internal and/or external databases, e.g., user database 518, document database 524, CRM database 532, and/or any other database. Further, the data retrieval may be initiated by microservice 504 in response to a search query soliciting one or more personas received from a user device 526 (as described in FIG. 9).

Figure 13:
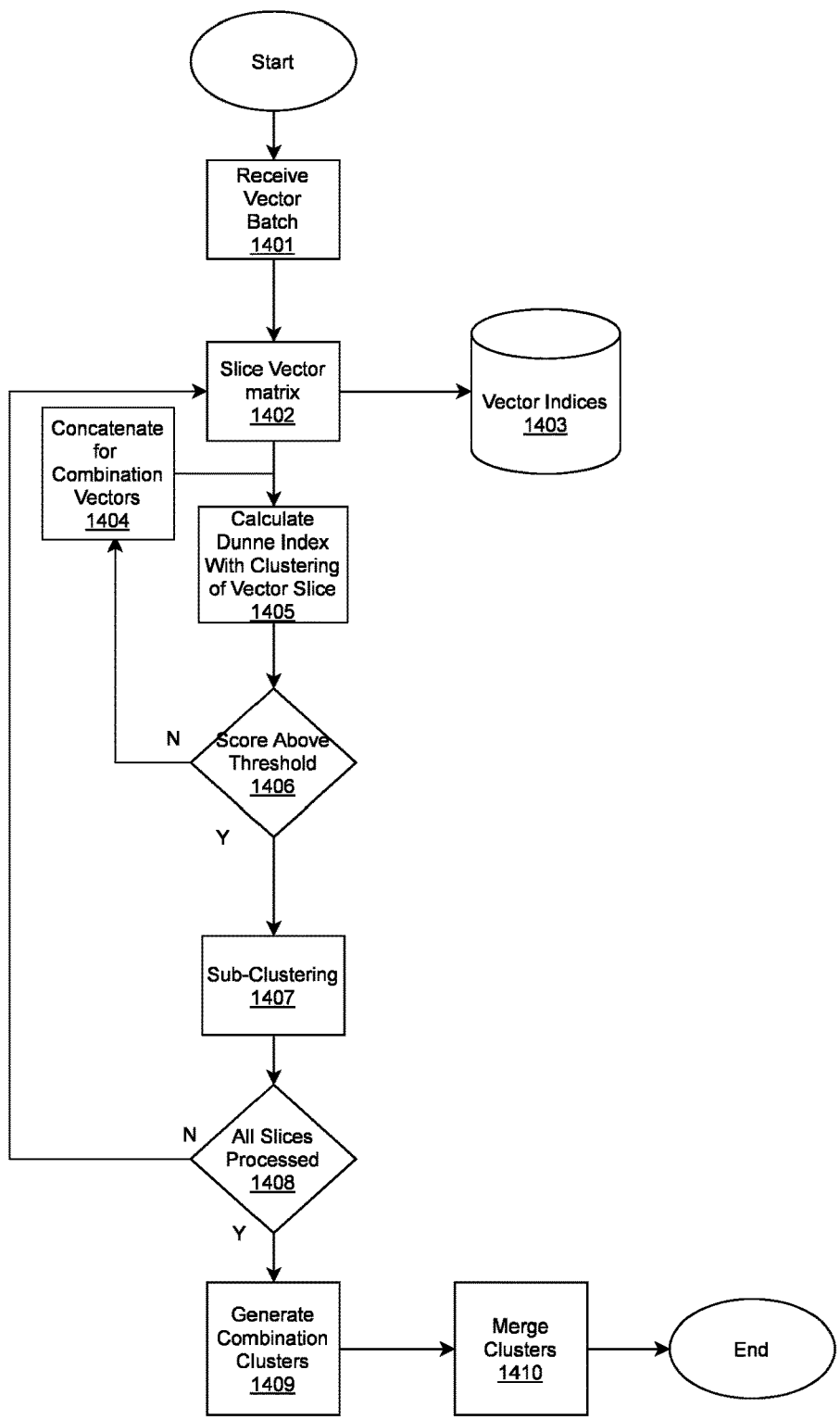
FIG. 13 is an exemplary flow diagram illustrating a method for hierarchical clustering, in accordance with an embodiment of the present invention.

Further, the retrieved data may be normalized by data transformer 541 using one or more data normalization techniques, as described in FIG. 13. In an embodiment, data transformer 541 may normalize the retrieved data in order to format the data in a predetermined uniform schema, i.e., a standardized data format, for further processing.

In a next step 603, project controller 540 may calculate an opportunity score for each of the plurality of customer accounts. In an embodiment, project controller 540 may calculate the opportunity score for a given customer account at least based on opportunity scoring attributes relating to, e.g., a sales process, contract information, deal size information, and the like. For instance, in one embodiment, the opportunity score for a customer account may be calculated by project controller 502 based on a determination of a placement of the customer account on a project management scale, having a plurality of progress tabs, each progress tab recognizing a completion of a task in the sales process for that customer account. According to the embodiment, a numeric value may be assigned by project controller 540 to each progress tab, such that when the customer account is placed at a given progress tab, such placement may trigger automatic assignment of the opportunity score to the customer account. In another embodiment, the opportunity scoring attributes may include fielded information such as account name, sale amount, open date, close date, forecast information, lead source, division, currency, and the like. Such a scoring for plurality of customer accounts is described in detail in FIG. 13.

In a next step 605, profile parser 508 may collect one or more data profiles, each data profile associated with at least one customer account from the data retrieved from the CRM applications described in the foregoing. In one embodiment, the data profiles may include data profiles, e.g., for owners of customer accounts, department personnel, organization heads, and the like. In the embodiment, such data profiles may include data pertaining to resumes, curriculum vitae (CV), website data, social media profiles, and the like for one or more persons associated with each customer account. In another embodiment, project controller 540 may also analyze the data profiles to extract the data profile attributes. According to the embodiment, each of the one or more data profile attributes may identify a user associated with a customer account such and profile parser 508. Further, in a next step 606 may match the plurality of data profiles to a master dataset to determine the plurality of data profile attributes associated with each customer account as described in detail in FIG. 12. project controller 540 In an embodiment the master dataset, e.g., user database 518 or CRM database 532 may be parsed by profile parser 508 to identify additional data profile attributes that may project controller 540 be used to complimenting the data retrieval and normalization step described in step 602. In an embodiment, such matching may ensure that the data profiles may be supplemented with additional data profile attributes in order to modify the data profiles to have more comprehensive information available. In an embodiment, project controller 540 may supplement the data profiles by identifying matches within the master dataset via hash values, such hash values comprising a hashed version of either a unique identifier, or a collection of identifiers which together may be unique. In the embodiment, once a match is found by project controller 540 in the master dataset additional fields from that data, both primary as well as modelled and/or predicted fields may be extracted.

In a next step 604, project controller 540 may rank the data profile attributes associated with each data profile. In an embodiment, project controller 540 may rank the data profile attributes based on their quantified importance in calculating the opportunity score for each of the customer account. In another embodiment, project controller 502 may generate the ranking for data profile attributes based on weighted totals for each opportunity scoring attribute, wherein the weights for each opportunity scoring attribute may be directly proportional to their relative quantified importance in generation of the project management scale. The ranking of opportunity score attributes is described in detail with respect to FIG. 13. In an embodiment, project controller 540 may leverage a plurality of statistical techniques to generate the quantified importance of each data profile attribute (and indirectly combinations of opportunity scoring attributes), for calculating the opportunity score for each customer account. According to one embodiment, project controller 540 may rank each data profile attribute based on a using a trained neural network comprising a single dense layer configured to predict the opportunity score. Project controller 540 may generate a sum of absolute values of edge weights between each data profile attribute and the dense layer, wherein a mean of the sum may be indicative of the quantified importance.

In a next step 607, feature generator 502 may iterate through the data profile attributes to generate a plurality of features associated with each data profile attribute to be included in a mathematical representation of the one or more data profiles. In a preferred embodiment, for data profile attributes comprising data profile attributes including an information-rich short string (e.g., job titles, company names, etc.), feature generator 502 may be classify one or more information components comprised within the data profile attributes separately. For example, for a data profile attribute comprising of job titles, following information types may be classified individually:

Job-title—"Senior Director, Technology—EMEA"
"Senior"→"Seniority Marker"
"Director"→"Function"
"Technology"→"Department"
"EMEA"→"Location"

In an embodiment, once the data profile attributes are scanned through by feature generator 502, it may classify one or more information components from the information rich short strings to extract a custom selection of information components by initiating a sequence prediction architecture comprising a set of conditional random field models created by model creator 506. According to the embodiment, a conditional random field (CRF) model may be executed by model creator 506 such that the model iteratively uses an output of one or more independently trained CRF models as augmented feature input to determine one or more interdependencies, wherein the iteration generates additional sequences of labels for the one or more information components using the conditional random fields model, each iteration updating the augmented feature input to reflect output labels of a previous iteration, until a preconfigured convergence criteria is met. The classification is further described with reference to FIG. 8.

In a preferred embodiment, the creation, training, and execution of the model by model creator 506, maybe such that the CRF model may allow treatment of each information component of the information rich short string separately in a vectorization of the information components by vectorizer 531. As such, there may be separate dimensions in a vector reserved for each information component, allowing a more direct and meaningful comparison of the information contained within the information component, versus a singular vector for the entire information rich short string. According to one preferred embodiment, vectorizer 531 may vectorize the custom selection of information components to encode characteristics associated with the custom selection of information components into a plurality of vectors by allocation of a dimension to each information component using semantic embedding to generate a plurality of vectorized data profiles. This is described in detail with reference to FIG. 8.

Referring again to FIG. 6, in a next step 608 model creator 506 may initiate an attribute-based hierarchical clustering routine. In an embodiment, the bespoke hierarchical clustering routine may find natural densities within the data profiles to enable characterizing the makeup of the data profiles in terms of the plurality of personas (as detailed in FIG. 14). In the embodiment, model creator 506 may commence the attribute-based hierarchical clustering routine to determine underlying densities within the vectorized custom selection of information components, for each of the plurality of data profile attributes, to generate sub-cluster configurations. In one embodiment, to generate the sub-cluster configurations, project controller 540 may compute a coefficient to identify an alternative result of the attribute-based hierarchical clustering routine to determine whether the alternative result generates a superior clustering outcome. Further, in response to a determination, by project controller 540, that the alternative result does not result in the better clustering outcome, project controller 540 may combine a given data profile attribute with a subsequent data profile attribute to select a set of data profiles from the plurality of data profiles, wherein the set of data profiles is classified within a cluster.

In a next step 609, project controller 540 may score each created cluster to compute a cluster score for each cluster. In an embodiment, each cluster may be scored based on ZZZ by project controller 540.

In a next step 610, generate a descriptive name for each cluster by leveraging a neural sequence2sequence architecture. In an embodiment, for each cluster, model creator 506 may feed each of the plurality of vectorized data profiles associated with a given cluster as an input into an encoder. Further, for each of the plurality of vectorized data profiles, model creator 506 may pass a representation through one or more network layers, to generate an intermediate representation, wherein the plurality of network layers comprise at least four long short-term memory (LSTM) network layers. Further, model creator 506 may pass the intermediate representation into a decoder to sequentially generate a plurality of word vectors up until a generation of an end-token. In an embodiment, the end-token may be indicative of completion of generation of a title for a cluster by the decoder. In another embodiment, model creator 506 may transform the plurality of word vectors into a plurality of words indicative of the descriptive name for the cluster.

Referring again to FIG. 6, in a next step 611 project controller 540 may initiate a query generator to generate a database query to generate new members for a given cluster, as described in detail with reference to FIG. 9. Further, feature generator 502 may generate a set of personas, each persona comprising data associated with a cluster the persona is classified in, associated cluster score for the cluster, ranked data profile attributes associated with the cluster, a descriptive name for the cluster, and a database query associated with the cluster. In an embodiment, project controller 540 may transmit the set of personas for display at a graphical user interface of the network-connected user device.

Figure 7:
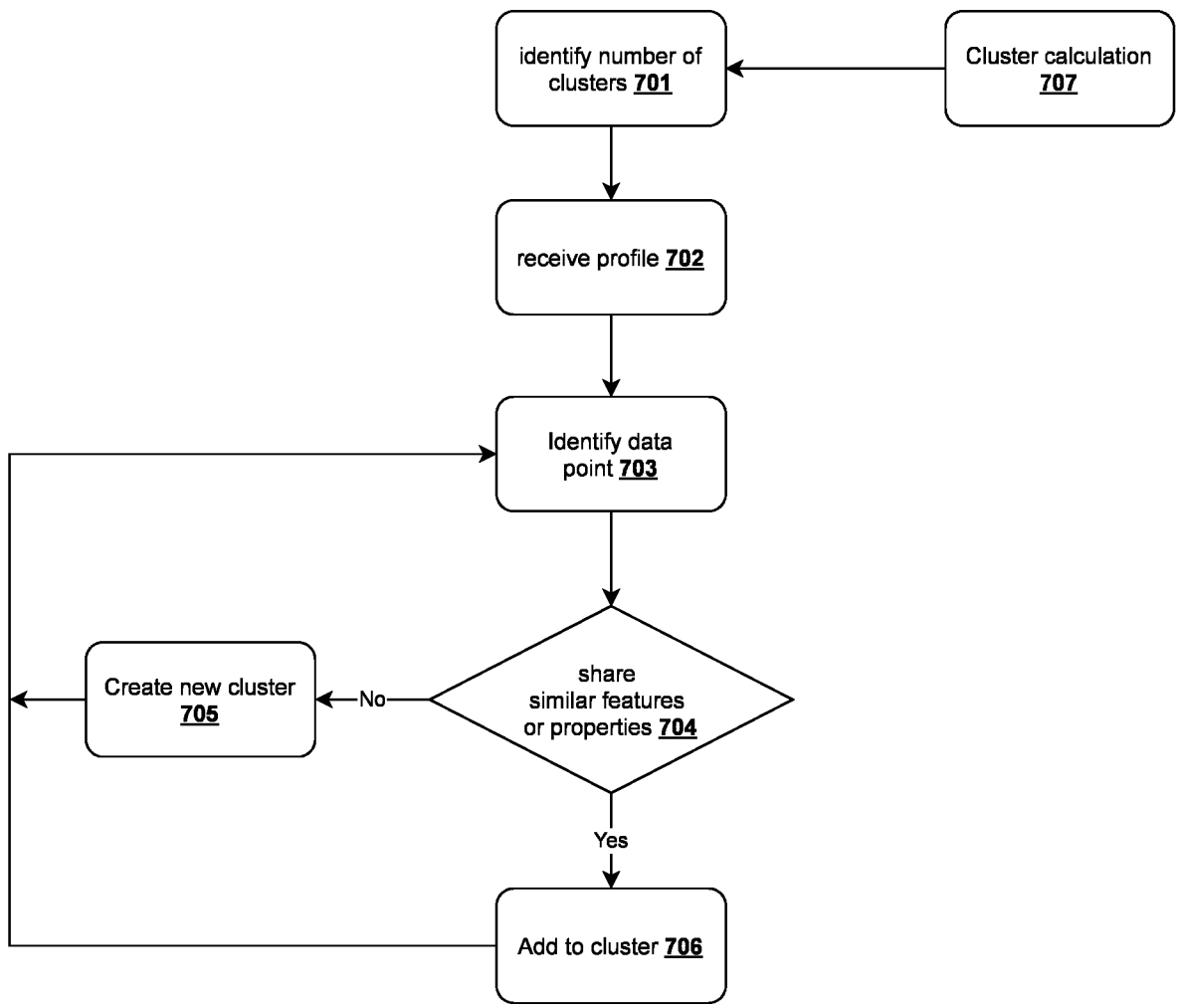
FIG. 7 is a flow diagram illustrating a method for projecting words and documents into a multidimensional vector space, according to a preferred embodiment of the invention.

FIG. 7 is a flow diagram illustrating a method for clustering a plurality of data points parsed from one or more data profiles into a vector, according to a preferred embodiment of the invention.

According to the embodiment, in a first step 701, one or more clusters are identified by profile parser 508. In an embodiment, the clusters may be identified by profile parser 508 based on data profiles received either from user devices 526, external services 528, or a combination of both. In another embodiment, in step 707, profile parser 508 may also compute one or more clusters based on an analysis of a processed dataset. For example, the dataset may have data pertaining to a social network associated with a data profile, a third-party and/or an internal CRM database, like CRM database 532; or a database comprising a plurality of profiles, such as user database 518.

In a next step 702, profile parser 508 may fetch a plurality of data profiles from one of an external services 528 or one of the databases within system 500. In a next step 703, profile parser 508 may identify one or more data points within each of the plurality of data profiles. In an embodiment, the data points may be indicative of small text components within the data profile. In the embodiment, unlike conventional techniques of classification of records, the present invention may utilize analysis of small text components to cluster and group different data profiles. For instance, instead of extracting keywords from a text corpora associated with the data profile and applying a topic model (such as Latent Dirichlet Allocation), profile parser 508 may instead utilize text sequence with a small number of tokens (for example ranging from 1-5). Therefore, utilizing a smaller number of tokens, instead of the conventional 40-100 tokens used to summarize documents, e.g., user resumes or curriculum vitae extracted from the data profiles, having text sequences having 400-800 sequences, the present invention facilitates identification of semantic meaning of a document, without the need of larger amounts of text. Such an analysis thereby reduces the requirement of a large pool of context to find an adequate vector, by using prior knowledge via pre-trained models, to understand which token spans in the string refer to which category of information. Ina preferred embodiment, the pre-classification of the small text components may allow for construction of a vector in a way that may allocate dimensions to each class of information in comparison to the substrings associated with each class explicitly, rather than mixing the information covered across the short-string (title), into one vector.

Referring again to FIG. 7, in a next step 704, profile parser 508 may determine whether two or more of the plurality of data profiles share similar features. In an embodiment, feature generator 502 may extract features for each of the plurality of data profiles from the identified data points. The features, in an example, may be generated based on analysis of the data points. In one embodiment, the data points may include fields such as designation, age, gender, organizational status, previous deal information, location tags, and the like. The data points may be extracted directly from the data profiles received from one or more of user devices 526, one or more databases, and/or data retrieved from external services 528. Further, said data points may be analyzed by feature generator 502 by normalization and disambiguation of data points. For instance, data points may be normalized to minimize duplicate data, avoid data modification issues, and/or to simplify data queries. Feature generator 502 may normalize data by using $1^{st}$, $2^{nd}$, and $3^{rd}$ normal forms, commonly known as 1NF, 2NF, and 3NF, respectively. For normalization of data under 1NF, data may be stored in a relational table, with each column containing atomic values. There may be no grouping of columns. For normalization of data under 2NF, the table may be stored in 1NF, and all columns of the table depend on the table's primary key. Finally, for normalization under 3NF, the table may be stored in the 2NF, and all columns do not depend on the primary key transitively. Further, feature generator 502 may perform data disambiguation by contextual as well as conceptual separation of multiple similar data points representing different ideas. In one embodiment, feature generator 502 may predict data profile attributes (e.g. predicting data profile attributes such as seniority class, department etc. from the title). Feature generator 502 may then semantically embed such data profile attributes.

In an embodiment, feature generator 502 may use one or more methods utilizing natural language processing (NLP) to perform said data disambiguation. For example, feature generator 502 may use one of "deep method" and "shallow method." In an example, the shallow method may involve disambiguation of text by looking at other text in vicinity to determine context. On the other hand, the deep method may involve combing larger sets of data and identify disambiguation in the context. It may be appreciated by a skilled person that other types of classifiers and tools for disambiguation may also be utilized and are within the scope of the present invention.

Referring again to FIG. 7, in a next step 705, if profile parser 508 determines that two or more of the plurality of data profiles do not share similar features, model creator 506 may create a new cluster. In an embodiment, model creator 506 may create one of a hard cluster or a soft cluster, in response to determining that there are no similar properties between two or more of the plurality of data profiles. For example, if each of the identified data points belong to at least one cluster completely, such a clustering may be deemed as hard clustering. On the other hand, by using a soft clustering method, a probability or likelihood of said data point to be in one or more clusters is assigned, instead of putting each data point into a separate cluster. Further, model creator 506 may use one or more of connectivity models, centroid models, distribution models, density models, K-means model, and the like to perform clustering of data points.

Referring again to step 704, if profile parser 508 determines that two or more profiles have similar properties that are found associated to an existing cluster, in a next step 706, said profiles are added to the existing cluster.

Figure 8:
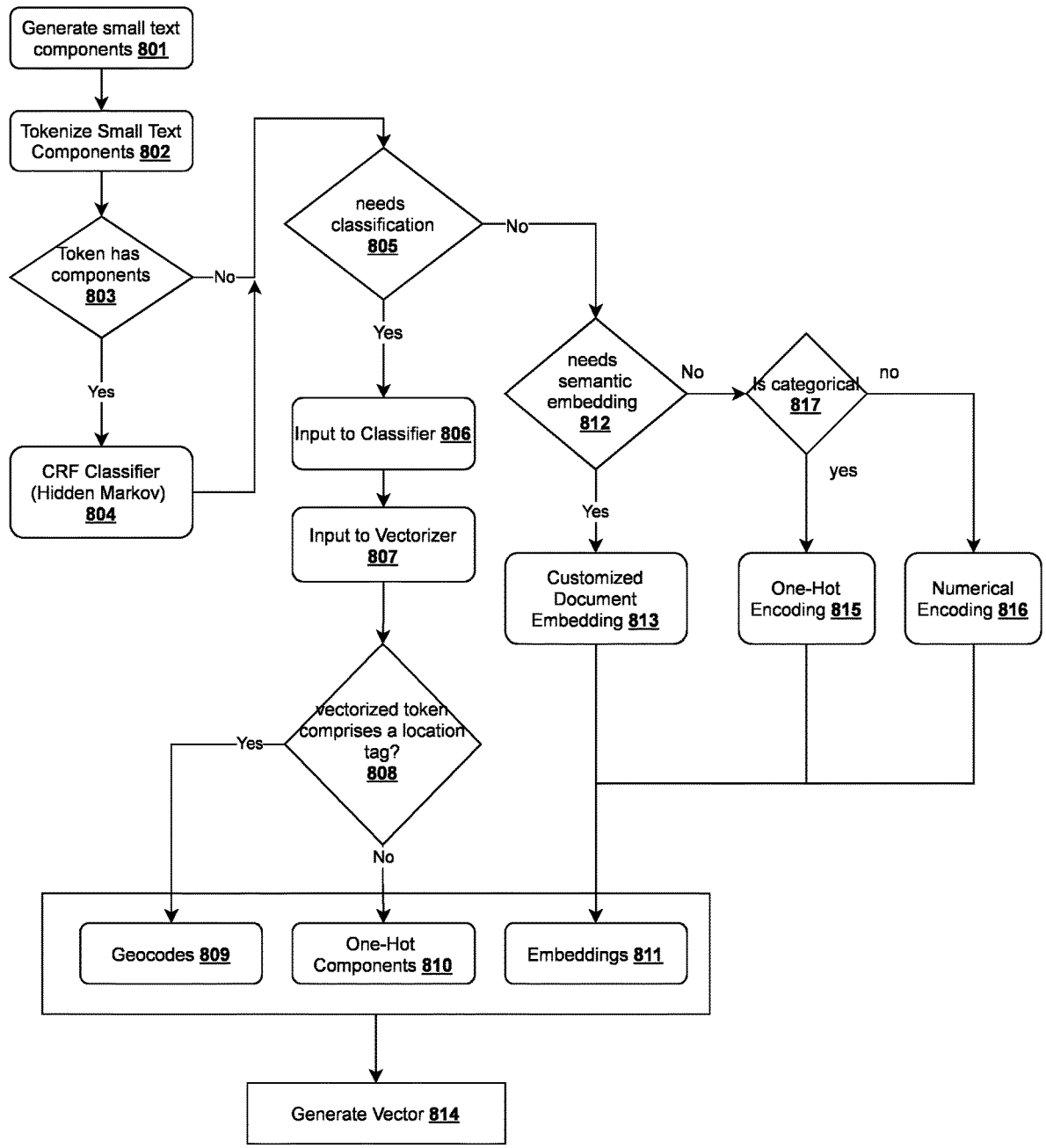
FIG. 8 is a flow diagram illustrating a method for classifying data profiles based on small text components, according to a preferred embodiment of the invention.

FIG. 8 is a flow diagram illustrating a method for classifying data profiles based on small text components, according to a preferred embodiment of the invention.

In a first step 801, profile parser 508 may generate one or more small text components from a plurality of data profiles received from user devices 526 and/or from external services 528. In a next step 802, tokenizer 529 creates tokens from the one or more small text components. In an example, tokenizer 529 may tokenize the small components such as indicators including, but not limiting to, designation, location, company, deal volumes, etc., into random string of characters, also known as a token. These tokens may contain words, sub-words, characters, etc. as recognized from the parsed data profiles. Further, tokenizer 529 may replace such tokens in a data set by their corresponding identifications (IDs). In an embodiment, tokenizer 529 may create IDs by looking the tokens up in an associative array or using a Hashing Trick. Tokenizer 529 may then also convert these tokens into one or more input formats, to be inputted into the classifier 530.

Referring again to FIG. 8, in a next step 803, model creator 506 may determine whether a given token comprises of small text components.

If it is determined that the given token comprises of small text components, in a next step 804, classifier 530 may use said token as an input for a Conditional Random Fields (CRF) classification (Hidden Markov classification). In an embodiment, classifier 530 may generate a sequence modelling algorithm for classification of the small text components, under the CRF classification model. In an example, under the CRF model, features of the small text components are dependent on each other, as well as classifier 530 may utilize future observations whilst learning new patterns. Classier 530, in one example, may use word sequences instead of words to recognize text classifications within a given data profile.

Referring again to FIG. 8, if it is determined, by model creator 506, that a token does not comprise of components, in a next step 806, model creator 506 may further determine whether classification is required for said token. If classification is required, in a next step 806, the token may be input into classifier 530. Classifier 530, in an embodiment, may classify said token by using one or more classification methods. For example, data profile attributes indicative of skills associated with a data profile may be inputted by classifier 530 to a topic model (LDA) to determine a top N topics which are best associated with the input set of skill data profile attributes. In an embodiment, such top N topics may be termed as "skillsets" and can be marked by classifier 530 a class for the skill data profile attributes.

Further, in a next step, classifier 530 may input said classified token to vectorizer 531. In an embodiment, vectorizer 531 may vectorize the classified token into an array of machine-readable numbers. In an example, vectorizer 531 may vectorize single instances of text, like characters and words, by using a neural network to represent tokens as vectors having a set of properties associated with them. In another example, a whole sentence in the text may be vectorized by vectorizer 531, for instance by using Skip-Thought Vectors. In one embodiment, the tokens may be vectorized by vectorizer 531 using techniques from the semantic embedding literature, e.g., word2vec, glove, or BERT embeddings.

In a next step 808, vectorizer 53 may determine whether the vectorized token comprises of a location tag. If it is determined that the vectorized token contains a location tag, in a next step 809, model creator may store the location tag as geocodes, for example, within training database 522. Otherwise, in a next step 810, model creator 506 may store the vectorized token as One-Hot Components.

Referring again to step 805, if the token does not need classification, in a next step 812, classifier 530 may determine if said token requires semantic embedding. According to an embodiment, if a data profile attribute comprises a text attribute, classifier 530 may either semantically embed the text attribute or classify the text attribute or do both. In an embodiment, wherein the text attribute is a "job title" (or component of a job title), the text attribute may be embedded or classified by classifier 530 to get a semantic vector. In an alternative embodiment, classifier 530 may alternatively classify the text attribute for a specific class, from a set of a predetermined number of classes and add the result of this classification as a feature for the CRF model to learn from.

If semantic embedding is required, in a next step 813, customized document embedding is performed on by classifier 530. In an embodiment, customized document embedding may be performed by classifier 530 in order to map words or phrases from document text to vectors of real numbers for further processing by vectorizer 531. For instance, classifier 530 may use methods such as word2vec etc. for said classification. In another embodiment, classifier 530 may train the CRF model using data specific to a given language domain.

Further, in a step 811, these customized embedded documents may be stored as embeddings within the training database 522 by classifier 530. In a next step 814, vectorizer 531 may generate a feature vector based on the geocodes, one-hot components, and the embeddings.

Referring again to step 812, if it is determined by classifier 530 that said token does not require semantic embedding, in a next step 817, model creator 506 may determine whether the data profile attribute is categorical. In response to a determination by model creator 506 that the data profile attribute is categorical, in a next step 815, classifier 530 may initiate one-hot encoding for the token. Otherwise, in a next step 816, classifier 530 may initiate numerical encoding for said token that may comprise initiating a numerical encoding for the data profile attribute value, entering the value directly into its own dimension within the vector.

The method may then continue to step 811, wherein customized embedded documents may be stored as embeddings within the training database 522 by classifier 530.

Figure 9:
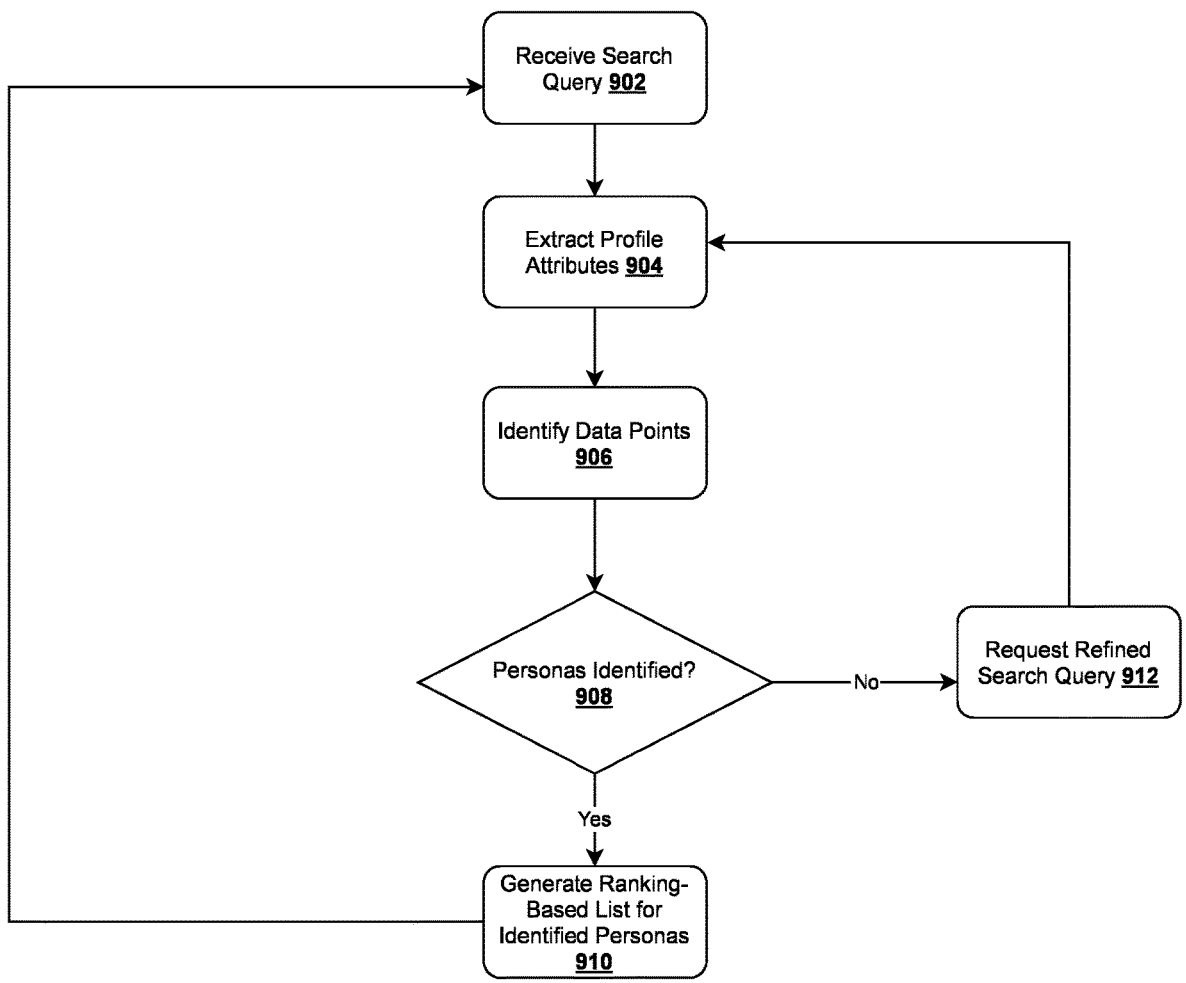
FIG. 9 is an exemplary flow diagram illustrating a method for generating ranked personas, according to a preferred embodiment of the invention.

FIG. 9 is an exemplary flow diagram illustrating a method for generating ranked personas, according to a preferred embodiment of the invention.

In step 902, vectorizer 531 may receive a search query from one or more user devices 526, requesting details about one or more personas. In a next step 904, profile parser 508 may extract data profile attributes, such as CRM related data profile attributes, user preference data profile attributes, social data profile attributes, and the like from the received search query. In an embodiment, CRM extractor 510 may identify CRM related data requested in the search query such as deal information, deal recency, lead status, lead conversion date, and the like. In another embodiment, social network filter 512 may determine requested data such as user preferences, location data, email data, messaging data, and the like from the search query.

Once the data profile attributes are extracted, in a next step 906, profile parser 508 may identify data points that may be required to generate results for the search query. For example, profile parser 508 may determine exact words and/or phrases from the profile attributes that may be used to search personas that may fulfil the search query conditions. Such data may include designation indicators, location tags, organization hierarchy indicators, and the like.

Based on the identified data points, in a next step 908, vectorizer 531 may determine if one or more personas match the search criteria. If it is determined, by vectorizer 531, that one or more personas match the search criteria, in a next step 910, vectorizer 531 may generate a ranked list comprising the one or more personas according to a distribution of opportunity scores associated with each data profiles belonging classified within each cluster. In other words, vectorizer 531 may use the value of a mean opportunity score associated with each persona, in order to rank the plurality of personas.

Otherwise, in a next step 912, vectorizer 531 may request for a refined search query. The method may then continue to step 904.

Figure 10:
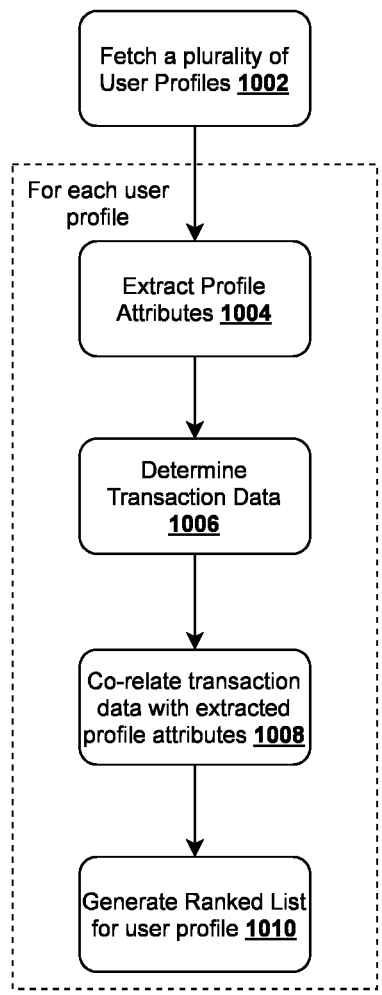
FIG. 10 is an exemplary flow diagram illustrating a method for generating rank lists for a plurality of data profiles, according to an embodiment of the present invention.

FIG. 10 illustrates an exemplary method for generating rank lists for a plurality of data profiles, according to an embodiment of the present invention.

According to the embodiment, the method may begin at step 1002, wherein microservice 504 may fetch a plurality of data profiles. In the embodiment, microservice 504 may fetch the plurality of data profiles from one or more user devices 526, external services 528, and/or user database 528.

In an embodiment, one or more components of persona generation computer 500 may perform steps 1004-1010 for each of the plurality of data profiles as described herein to generate ranked list of the plurality of data profiles extracted by microservice 504. In step 1004, CRM extractor 510 may extract one or more profile attributes for a given data profile. In an embodiment, the one or more profile attributes may be extracted from search queries previously received by microservice 504 from one or more of user devices 510. In the embodiment, the one or more profile attributes may be extracted based on CRM related data identified by CRM extractor 510, within the search query including, but not limiting to, deal information, deal recency, lead status, lead conversion date, and the like. In another embodiment, one or more profile attributes may further be extracted by CRM extractor 510 based on data determined by social network filter 512 including user preferences, location data, email data, messaging data, and the like from the search query.

In a next step 1006, microservice 504 may determine transactional data associated with the given data profile. In an embodiment, the transactional data may be inclusive of, lead information, opportunity information, contact creation date, lead status, lead conversion date, deal volume, and the like associated with the given data profile. In the embodiment, the transactional data may be determined by microservice 504 by querying one of user database 518 and external database 528.

In a next step 1008, microservice 504 may correlate the extracted one or more profile attributes for the given data profile with the transactional data associated with the given data profile. In an embodiment, microservice 504 may correlate the one or more profile attributes with the transactional data by comparing the one or more profile attributes such as location data, email data, messaging data, deal data, and the like with transactional data such as lead status, lead conversion date, deal volume, and the like associated with the given data profile, to generate a mapping between the data profile attributes and corresponding transactional data. In an embodiment, classifier 530 may train a neural network with a single dense layer (shallow network) with the task of predicting the scores assigned to each persona. In the embodiment, project controller 540 may sum absolute values of edge weights between each data profile attribute and the dense layer of nodes. Further, a mean score across the dimensions associated with the data profile attributes may be used by project controller 540 as a proxy for quantified importance of each data profile attribute. In one embodiment, classifier 530 may normalize the dimensions using an a-z normalization prior to this routine, to ensure that distributional variances in scale are accounted for.

Further, the comparison may be performed by microservice 504, in one embodiment, based on identification of one or more data points within the given data profile, by profile parser 508. In an embodiment, the data points may be indicative of small text components within the data profile and may be parsed to extract and map profile attributes to transactional data, as described in the foregoing with respect to FIG. 7.

Referring again to FIG. 10, in a next step 1010, microservice 504 may generate a rank list for the data profile.

Figure 11:
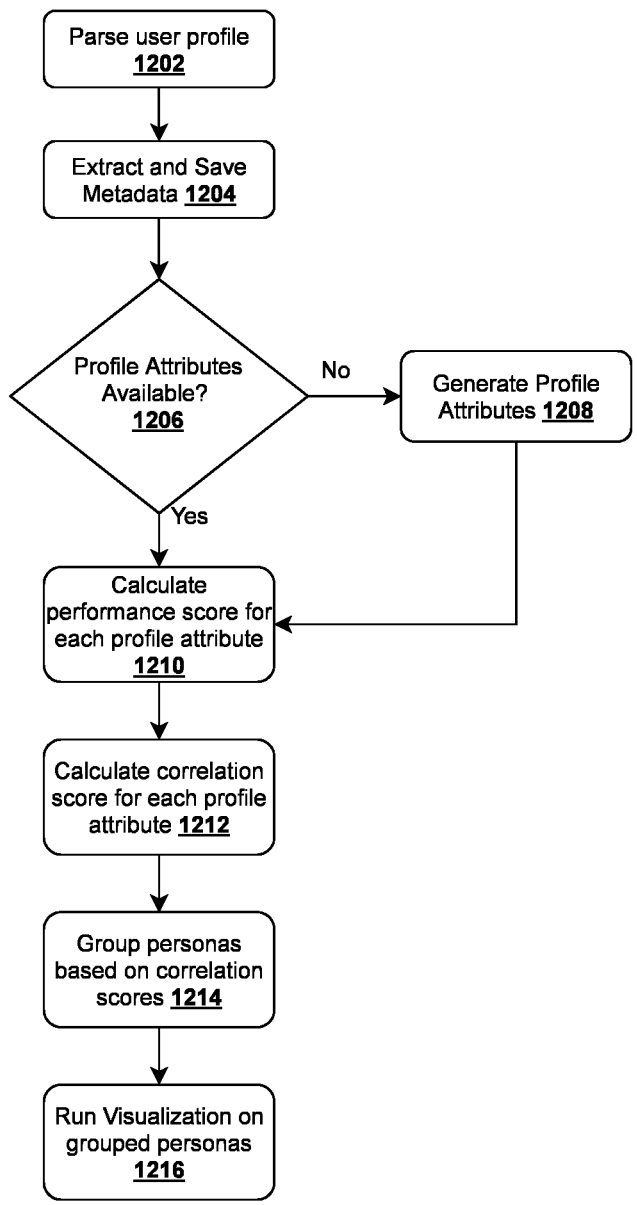
FIG. 11 is an exemplary flow diagram illustrating a method grouping a plurality of personas for running visualizations, in accordance with an embodiment of the present invention.

FIG. 11 illustrates an exemplary for grouping a plurality of personas for running visualizations, in accordance with an embodiment of the present invention.

According to the embodiment, the method may begin at step 1202, wherein profile parser 508 may parse a plurality of data profiles. In a next step 1204, profile parser 508 may extract and store metadata for each of the plurality of data profiles. In an embodiment, profile parser 508 may extract metadata including, but not limited to, data points such as gender, age, location, designation, company relationships, organizational hierarchy, business volumes, and the like associated with said data profiles. Further, in an embodiment, profile parser 508 may store the extracted metadata into a metadata object. As described in the foregoing, profile parser 508 may comprise, at least, CRM extractor 510 to identify and extract CRM data associated with a data profile; social network filter 512 for filtering and parsing social network associated with a data profile; and user data filter 514 for parsing received data profiles to extract user preference data associated with a data profile.

In a next step 1206, microservice 504 may determine whether one or more profile attributes are available for a given data profile. In an embodiment, microservice 504 may determine whether one or more profile attributes are available, by querying user database 518 and/or document database 524 for previously stored profile attributes for each of the plurality of data profiles. In case it is determined by microservice 504 that the one or more profile attributes are not available, in a next step 1208, CRM extractor 510 may generate the one or more data profile attributes, as described in FIG. 10. Otherwise, in a next step 1210, microservice 504 may calculate a performance score for each data profile attribute extracted for each data profile.

In a next step 1212, microservice 504 may calculate a correlation score for each profile attribute. In one embodiment, microservice 504 may calculate the correlation score for a profile attribute, based at least on the correlation of the profile attribute with corresponding transactional data, as described in the foregoing. Further, microservice 504 may calculate the correlation score using relative data profile attribute quantified importance through a trained prediction model, as described above. In an embodiment, the data profile attribute weights may be learned.

In a next step 1214, microservice 504 may group a plurality of personas based on the correlation score. In an embodiment, the plurality of personas may be grouped together by microservice 504 when each of the plurality of personas have an associated correlation score within a predetermined range.

In a next step 1216, microservice 504 may run visualizations on the grouped plurality of personas.

Figure 12:
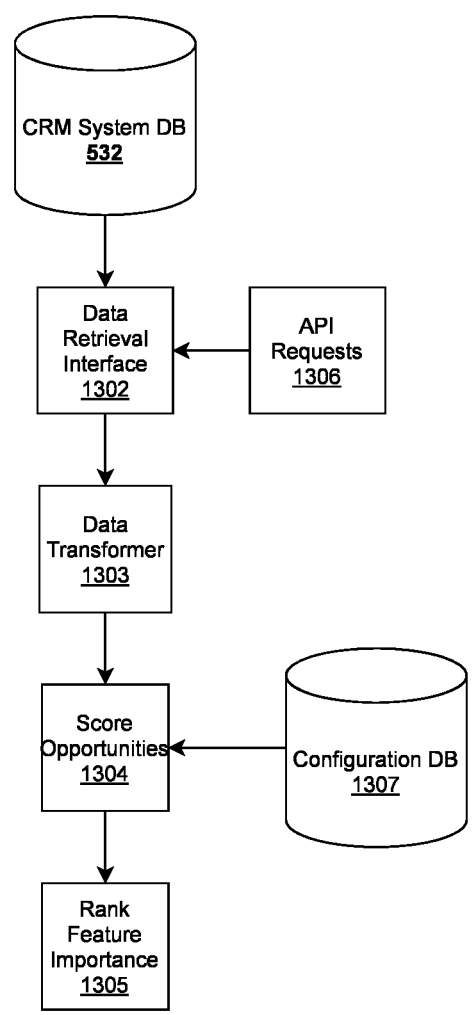
FIG. 12 is an exemplary flow diagram illustrating a method for ranking data profile attributes based on their respective quantified importance, in accordance with an embodiment of the present invention.

FIG. 12 illustrates an exemplary method for ranking data profile attributes based on their respective quantified importance, in accordance with an embodiment of the invention.

The method may begin at step 1302, wherein microservice 504 may receive one or more requests from a plurality of user devices 526. In an embodiment, the one or more requests may initialize microservice 504 to collect relevant documents such as electronic documents comprising emails, chat transcripts from messaging platforms, speech-to-text communications, social network posts, location tags, and the like for each data profile, from CRM database 532, as depicted. The CRM database 532, in one embodiment, may have stored a collection of documents for the each of the plurality of data profiles, such that each record may be indicative of a development process of an outreach transaction through different stages, e.g., initial touchpoint to a deal closure, and further to expansion and diversification activities for a given data profile. In an embodiment, the one or more requests from the user devices 526 may be received as Application Program Interface (API) requests at persona generation computer 500, as depicted by block 1306. In the embodiment, the API requests may be triggered when one or more of the user devices 526 requests generation of personas, through persona generation computer 500.

In a next step 1303, data transformer 541 may normalize data contained in each relevant document and identify a plurality of key fields in which the normalized data may be segregated. In an embodiment, normalization of the data contained within each relevant document may be performed by data transformer 541 by parsing over the input structure, and reorganizing the input data structures, in a way that conforms with a universal schema format, which the subsequent pipeline expects. Importantly source and datapoint timestamps are managed on a field by field basis within the schema, providing the advantage of enabling the organization and sorting of field values according to the source confidence, and freshness by time.

In a next step 1304, microservice 504 may apply a numerical score to opportunity information associated with a given data profile based on some input configuration. In an embodiment, the numerical score is derived by project controller 540 from the project management scale, which may be pre-configured by a user device, as specified in the foregoing.

In an embodiment, the opportunity information may be included within the customer relationship management (CRM) profile information for the data profile, as stored within CRM database 532. Further, opportunity information may be updated for each data profile within the CRM database 532 by microservice 504 based on, e.g., different stages of a sales process generating different scores or deal size adding different weights, etc.

The scores, specified by the configuration 1307 and applied within the opportunity scoring 1304, may be used as a target by which we may rank the information value richness of each attribute. Here we may derive the value of a feature, or plurality of features, in terms of its (their) ability to act as indicators for the ultimate opportunity score of a profile.

In a next step 1305, model creator 506 may apply one or more methods known in the art such as training a predictor to predict scores, and/or extracting weights from a neural network, or regressor to generate the relative importance, and associated rankings, for a plurality of features generated by feature generator 502 for each data profile. Ranked features may be used downstream to select features for the vector representation, which may offer computational and modelling benefits; by reducing the number of features included by removing those of minimal value reduces the complexity of matrix operations and allows models to converge faster on core indicators. The attribute scores may also be used to or to weight features in the vector space according to their relative importance, pre-clustering, giving more important features a more highly weighted, and thus influential role in distance calculations, and by extension clustering.

FIG. 13 illustrates an exemplary method for hierarchical clustering, in accordance with an embodiment of the present invention.

According to the embodiment, the method may begin at step 1401, wherein hierarchical clustering system 543 receives a batch of profile vectors, in the form of a matrix.

In a next step 1402, vectorizer 531 may obtain one or more vector indices, each representing elements over which each feature of the data profile may be represented, from the vector indices database 532, as shown. Further, the received matrix is sliced into sub matrices by vectorizer 531, each representing a set of vectors for each feature of the data profile.

In a next step 1405, the sub-matrices created by vectorizer 531 may be iteratively passed from the feature matrix to project controller 540 to finds sub-cluster configurations and calculate Dunne index values, in order to generate a gap statistic score by model creator 506, to find an optimal number of clusters for a distribution of datapoints within the data profile data. In an embodiment, this measure may be performed to determine numerical values for intra-cluster variability, with different numbers of hierarchal divisions. In one embodiment, the Dunne index score may be indicative of a measure of the average cosine separation between clusters, with each the cosine separation between each cluster defined as the mean cosine distance between each constituent member of one cluster and the members of the another cluster, divided by a measure of the size of a the clusters, the prescribed measure being the average.

In step 1406, model creator 506 may use the gap statistic score to determine whether formation of clusters over the sub-matrix representing a single feature in isolation is advisable, by comparison of the gap statistic score to a predetermined threshold value. In response to a determination that the gap statistic score for a given feature is not greater than the predetermined threshold, the specific feature may be withheld by microservice 504, and the sub-matrices associated with the feature may be concatenated with another appropriate feature as depicted in step 1404. The concatenation may be done by model creator 506 to create a sub-cluster of higher dimensionality and information richness. The method may then continue to step 1405.

Further, in a next step 1407, model creator 506 may cluster a single feature, or concatenated features, into an optimal number of clusters, as determined by the gap statistic score. In an embodiment, model creator 506 may utilize one or more traditional methods for clustering such as k-means clustering, k-mode clustering, and the like.

In a next step 1408, once all slices have been processed and clustered, model creator 506 may execute instructions as depicted in steps 1409-1410. In step 1409, model creator 506 may identify a combination of clusters by sorting data profiles by the combination of clusters they belong to. In an embodiment, if a first data profile belongs to a first cluster associated with a job title "semantic clustering", and also to a second cluster associated with a combination of industry and department, the first data profile may be placed in a cluster generated from the combination of the first and second clusters. Further, each cluster may represent an individual axis, such that combination clusters, recognizing a persona may be created for each data profile.

In a next step 1410, model creator 506 may calculate an intra-cluster variability score. In an embodiment, the intra-cluster variability score may be indicative of whether the combination clusters have appropriate separation. In another embodiment, for combination clusters which have intra-cluster variability score greater than a predetermined threshold, model creator 506 may merge such combination clusters. Such merging may yield the final selection of clusters.

In a preferred embodiment, the method described in the foregoing may be advantageous in that clusters may be generated such that they are more distinct at each feature rather than a single clustering over an abstract combination of the entire feature set. The clustering may therefore have a more direct and interpretable meaning. Such a method may also facilitate an easily interpretable cluster for a user as well as enables a downstream task of predicting a name and a query for the cluster (as described in FIG. 15).

Figure 14:
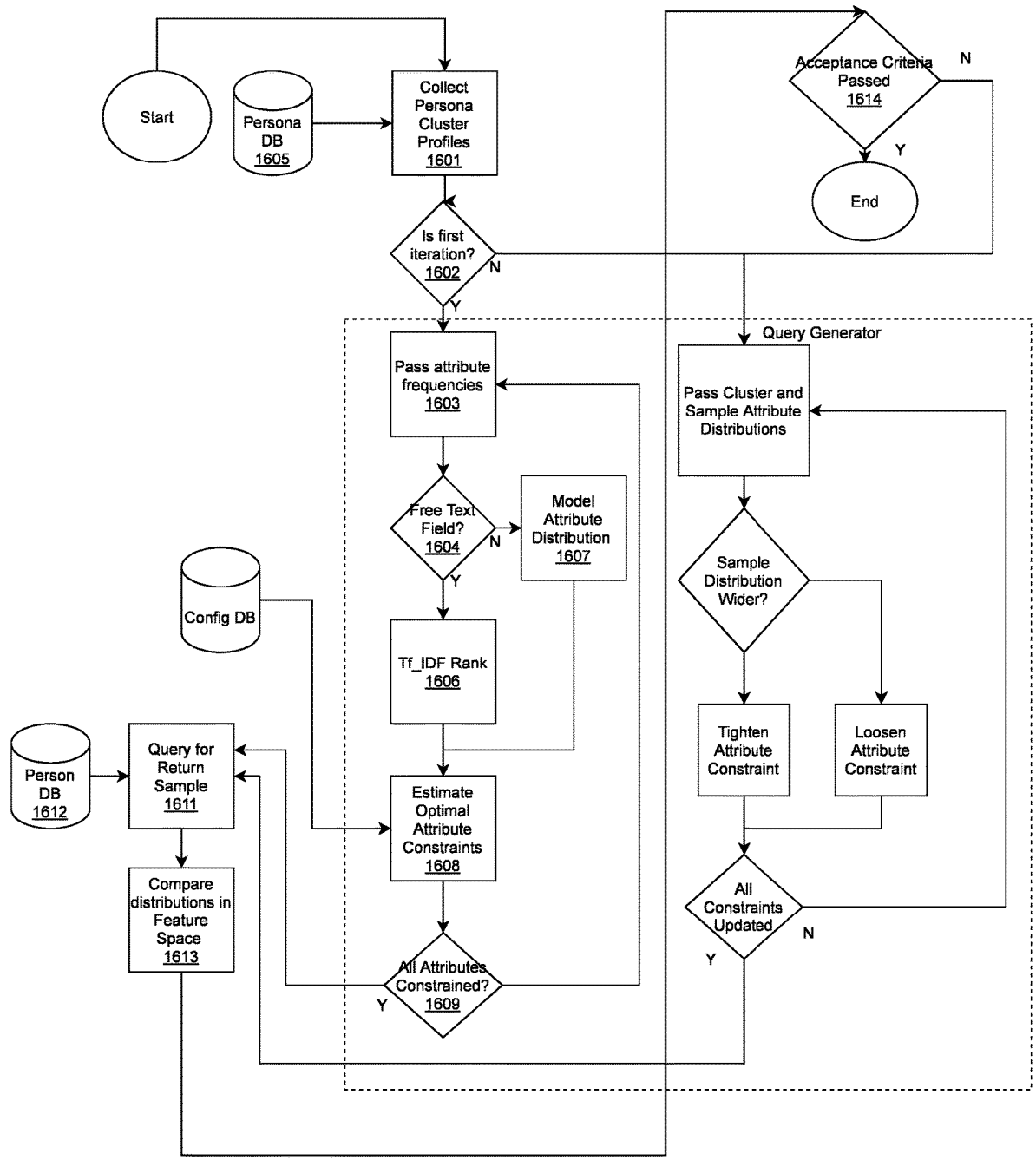
FIG. 14 is an exemplary flow diagram illustrating a method for name generation for personas, according to a preferred embodiment of the invention.

FIG. 14 illustrates an exemplary method for name generation for personas, according to a preferred embodiment of the invention.

According to the embodiment, the method may begin at step 1501, wherein microservice 504 retrieves a persona containing multiple data profiles. In an embodiment, the persona may be retrieved from persona database 530 as depicted.

In a next step 1502, an empty array may be created by vectorizer 531 to hold the one or more vectors, received from vector indices database 532, in the memory of persona generation computer 500.

Further, in a next step 1503, vectorizer 531 may generate a profile vector for a given data profile within the array. In an embodiment, the profile vector may be created by vectorizer 531, based on methods described in the foregoing with respect to FIG. 8. Further, in another embodiment, the profile vector may be generated by vectorizer 531 based on the one or more attributes associated with the data profile. Vectorizer 531 may then append the profile vector to the array.

In a next step 1505, model creator 506 may utilize iterations through all data profiles that have been vectorized by vectorizer 531, to generate a complete array of profile vectors for the cluster, in which the data profiles are grouped. Further, in a next step 1506, model creator 506 may determine whether there are more data profiles left to be vectorized by vectorizer 531. In case it is determined by model creator 506 that no more data profiles are left, the method may continue to step 1503. Otherwise, model creator 506 may initiate an encoder-decoder model to process each array, executing steps as described in conjunction with steps 1507-1511.

In step 1507, model creator 506 may pass an array comprising profile vectors to a pretrained encoder (not shown), e.g., composed of layers of RNN units (Long Short Term Memory, or GRU). The encoder, in one embodiment, may handle input profile vectors sequentially, thereby generating an optimal abstract representation of the sequence at each timestep. Once the entire input sequence of profile vectors is passed through the encoder, by model creator 506, an "encoded" or "intermediate" representation for the sequence may be generated.

In a next step 1508, model creator 506 may pass the intermediate representation as input to a decoder (not shown), comprised of multiple layers of RNN layers (LSTM or GRU typically). The decoder, in one embodiment, may be pretrained by classifier 530, to optimize for the task of generating appropriate descriptive names, based on the intermediate representations passed by the encoder. Further, in some embodiments, tokenizer 529 may generate, name words are generated, sequentially for each token, until a special end token is generated. The generation of this token may be indicative of the end of the process of name generation.

In an embodiment, for the above method of name generation, the encoder-decoder model may be pretrained by classifier 530 to find an optimal configuration for the predictions of names. The input data would for the model may consist of sequences of profile vectors and the output may be comprised of the sequences of words which form the name of the persona. In a preferred embodiment, tens or hundreds of thousands of hand-named examples may be labelled by classifier 530 to train a high performance encoder-decoder model.

Figure 15:
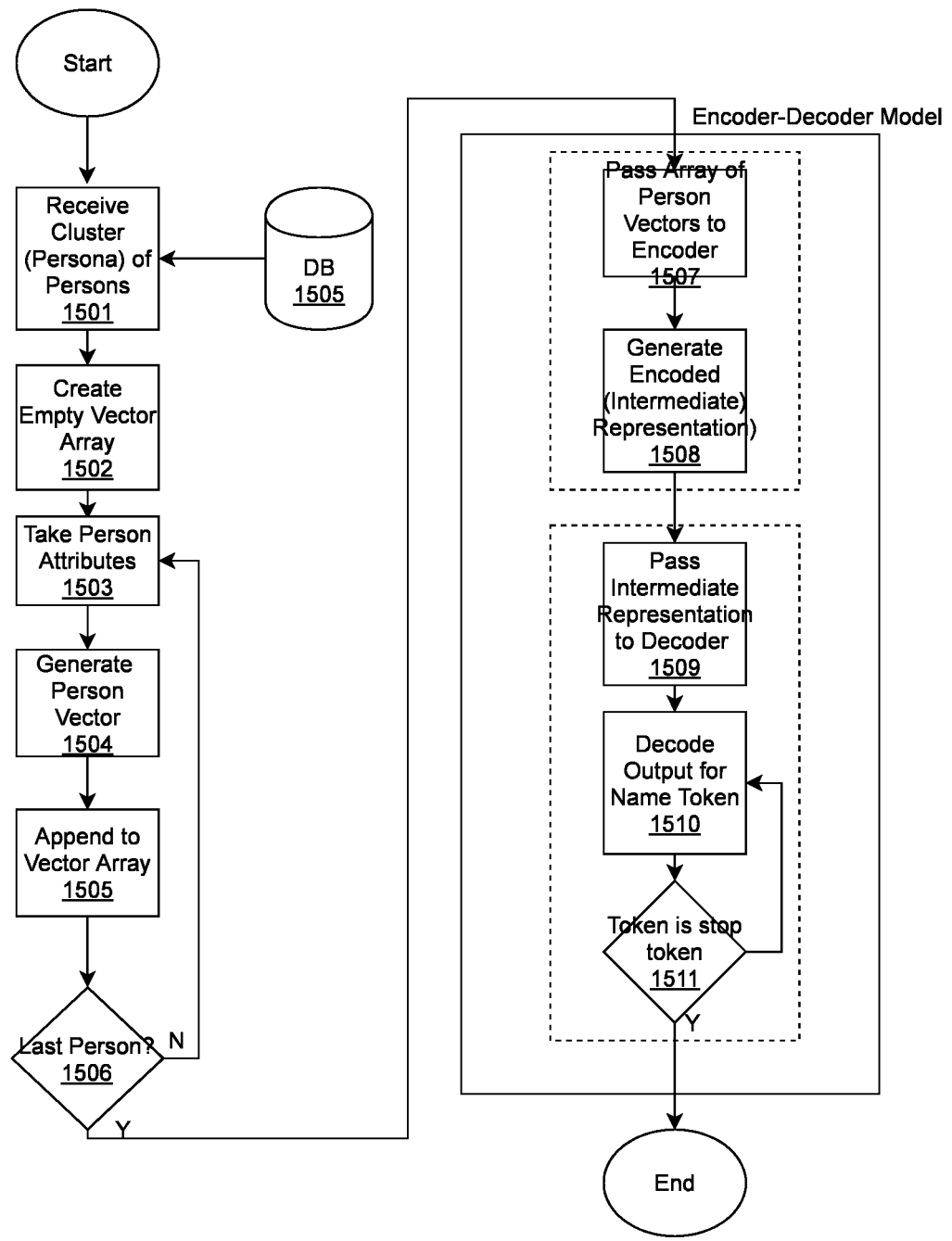
FIG. 15 is an exemplary flow diagram illustrating a method for database query generation for personas, according to a preferred embodiment of the invention.

FIG. 15 illustrates an exemplary method for database query generation for personas, according to a preferred embodiment of the invention.

In a first step 1601, clusters comprising data profiles are retrieved from the persona database 530 by microservice 504. In a next step 1602 microservice 504 may determine whether a first iteration of query generation is active. In response to a determination by microservice 504 that the first iteration of query generation is not active, the method may continue to step 1610. Otherwise, in a next step 1603, microservice 504 may pass attribute frequencies associated with the cluster to initiate a "simplistic" frequency based method.

In an embodiment, in a next step 1604, model creator 506 may determine whether free text fields are available. In case of determination by model creator 506 that free text fields are unavailable, in a next step 1607, an initial query may be generated by model creator 506, using model attribute distribution. In one embodiment, model creator 506 may initialize model attribute distribution by generating value frequencies across each feature for each data profile. In an example, value frequencies for textual categories may be simple frequencies. In another example, value frequencies for numerical variables may include a distribution over some continuous range, segregated into buckets.

However, in case it is determined by model creator 506, that free text fields are available, in an embodiment, frequencies per observed n-gram may be computed (e.g., combination of tokens, where 1-gram equals 1 token up to the longest chain of tokens found in the available free text field). In a next step 1606, for free text fields the "simplistic" first query constraint for a given text field may be generated by model creator 506 by ranking the n-gram terms, via a "term frequency inverse document frequency" (tf-idf) approach, wherein the most significant terms according to their relative prominence in the cluster may be identified in comparison to term prominence in a wider data universe (e.g., the entire data profile). In a preferred embodiment, by performing the ranking, model creator 506 may find one or more terms that are most indicative of the free text field for the given cluster. Further, model creator 506 may choose a threshold for the terms that are included (either a hard coded ranking, a hard coded tf-idf threshold or a learned threshold according to some trained selection algorithm). The set of included search terms may further constrain the query for a given attribute, as described in step 1608.

In a next step 1607, for numerical and categorical data ranges and sets of categories, frequency density/frequency distribution may be generated by model creator 506. In one embodiment, for numerical and categorical data ranges and sets of categories, in step 1608, optimal constraints may be generated by model creator 506 according to a frequency density threshold. In several embodiment, thresholds may be either be hard coded or learnt via a model, by model creator 506.

In a next step 1609, once all attributes are initially constrained by model creator 506, the search query may be generated for the cluster, by model creator 506. Further, in step 1611, microservice 504 may query for a sample of the persons, that are generated based on the search query, by sending the search query to the persona database 530.

In a next step 1613, microservice 504 may compare the distribution of the input persona to the distribution of the persons returned via the search query, across the feature space. In an embodiment, microservice 504 may perform such comparison with the use of datasphere based comparisons, such as to avoid dimensionality, when using a high dimensional representation for personas.

Further, in a next step 1614, once a similarity measure have been generated by microservice 504, a threshold (e.g., hard-coded or learnt) may be used as an acceptance criteria. Alternatively, a maximum number of iterations through the query generation engine may be specified by model creator 506. If this condition is fulfilled, the final query may be accepted and returned to user device 526 by model creator 506.

The advantage of the methods described herein may be to generate readable queries, which may be optimized to match the make-up of the input persona. The queries may be sent directly to a search engine or database and place well defined constraints over each attribute to define the persona in querying language.

The skilled person will be aware of a range of possible modifications of the various embodiments described above. Accordingly, the present invention is defined by the claims and their equivalents.

What is claimed is:

1. A system for automatic persona generation, using information components, the system comprising:
 a persona generation computer comprising a memory, a processor, and a plurality of programming instructions, the plurality of programming instructions stored in the memory, when executed by processor, cause the processor to:
 obtain, from a network-connected user device, a search query soliciting a plurality of personas;
 securely synchronize encrypted customer account data for a plurality of customer accounts from one or more applications, the customer account data for each customer account indicative of a placement of a customer account on a project management scale, wherein the project management scale comprises of progress tabs, each progress tab recognizing a completion of a task;
 identify a data format for the synced customer account data for each customer account;
 normalize the customer account data for each customer account, based at least on the respective data format, to convert the customer account data for each customer account to a uniform standardized data structure;
calculate an opportunity score for each customer account, based at least on the placement of each customer account on a progress tab at the project management scale, wherein the opportunity score is calculated at least using a plurality of customizable variables;
collect a plurality of data profiles, each data profile linked to a customer account, wherein each data profile comprises of one or more data profile attributes each identifying a user associated with a customer account;
match the plurality of data profiles to a master dataset to determine a plurality of data profile attributes associated with each customer account;
rank each data profile attribute based on a quantified importance of each data profile attribute in determination of the opportunity score using a trained neural network comprising a dense layer configured to predict the opportunity score to generate a sum of absolute values of edge weights between each data profile attribute and the dense layer, wherein a mean of the sum is indicative of the quantified importance;
determine a subset of data profile attributes to extract a plurality of features associated with a data profile, wherein at least one data profile attribute of the subset of data profile attributes comprises of information rich short strings;
classify one or more information components from the information rich short strings to extract a custom selection of information components by initiation of a sequence prediction architecture comprising a set of conditional random field models, wherein a conditional random field model iteratively uses an output of one or more independently trained conditional random field models as augmented feature input to determine one or more interdependencies, wherein the iteration generates additional sequences of labels for the one or more information components using the conditional random fields model, each iteration updating the augmented feature input to reflect output labels of a previous iteration, until a preconfigured convergence criteria is met;
vectorize the custom selection of information components to encode characteristics associated with the custom selection of information components into a plurality of vectors by allocation of a dimension to each information component, to enable vector comparison between information components of an information rich short string using semantic embedding to generate a plurality of vectorized data profiles;
commence an attribute-based hierarchical clustering routine to determine underlying densities within the vectorized custom selection of information components, for each of the plurality of data profile attributes, to generate sub-cluster configurations, wherein to generate the sub-cluster configurations, the programming instructions when executed by the processor, cause the processor to:
compute a coefficient to identify an alternative result of the attribute-based hierarchical clustering routine to determine whether the alternative result generates a superior clustering outcome, and
in response to a determination that the alternative result does not result in the better clustering outcome, combine a data profile attribute with a subsequent data profile attribute to select a set of data profiles from the plurality of data profiles, wherein the set of data profiles is classified within a cluster;
calculate a cluster score for each cluster; and
generate a descriptive name for each cluster by leveraging a neural sequence2sequence architecture, wherein for each cluster, the programming instructions when executed by the processor, further cause the processor to:
feed each of the plurality of vectorized data profiles associated with a given cluster as an input into an encoder;
for each of the plurality of vectorized data profiles, pass a representation through one or more network layers, to generate an intermediate representation, wherein the plurality of network layers comprise at least four long short-term memory (LSTM) network layers;
pass the intermediate representation into a decoder to sequentially generate a plurality of word vectors up until a generation of an end-token, wherein the end-token is indicative of completion of generation of a title for a cluster, by the decoder,
transform the plurality of word vectors into a plurality of words indicative of the descriptive name;
initiate a query generator to generate a database query for each cluster to generate new members for each cluster;
generate a set of personas, wherein each persona comprises data associated with a cluster the persona is classified in, associated cluster score for the cluster, ranked data profile attributes associated with the cluster, a descriptive name for the cluster, and a database query associated with the cluster; and
transmit the set of personas for display at a graphical user interface of the network-connected user device.

2. The system of claim 1, wherein the plurality of programming instructions stored in the memory, when further executed by processor, cause the processor to optimize the query generator to reproduce one or more distributional properties of a first cluster in response to an execution of the database query at an exhaustive database in successive iterations.

3. The system of claim 2, wherein the plurality of programming instructions stored in the memory, when further executed by processor, cause the processor to:
generate a first database query in a first iteration of the successive iterations, the first database query comprising at least a subset of data profile attributes associated with the first cluster, the subset of data profile attributes including one or more of categorical attributes, numerical attributes, and text attributes;
model a frequency distribution using a term frequency-inverse document frequency (TF-IDF) routine to generate respective thresholds for each of the categorical attributes and the numerical attributes;
use the TF-IDF routine for the text attributes to determine terms having a highest value of relative significance to a cluster;
compute a gradient descent algorithm to generate a second database query, in response to executing the first database query after a successive iteration, based at least on a comparison of one or more properties of a second cluster returned by the first database query with one or more properties of the first cluster using a Dunne index, wherein the successive iterations are executed until the respective thresholds are met and/or till a maximum number of successive iterations are complete.

* * * * *